United States Patent
Fujiwara et al.

(10) Patent No.: US 6,362,802 B1
(45) Date of Patent: Mar. 26, 2002

(54) METHOD AND APPARATUS FOR ACQUIRING AN IMAGE FOR INSPECTION OF A FLAT PANEL DISPLAY

(75) Inventors: Kiyoshi Fujiwara; Masayoshi Ichikawa, both of Tokyo (JP)

(73) Assignee: Advantest Corporation, Tokyo (JP)

( * ) Notice: Subject to any disclaimer, the term of this patent is extended or adjusted under 35 U.S.C. 154(b) by 0 days.

(21) Appl. No.: 09/326,009

(22) Filed: Jun. 4, 1999

(30) Foreign Application Priority Data

Jun. 4, 1998 (JP) .......................................... 10-155675

(51) Int. Cl.⁷ ................................................ G09G 5/36
(52) U.S. Cl. ......................................... 345/87; 345/136
(58) Field of Search ................................ 345/136, 137, 345/138, 428; 348/218, 219, 207, 335, 342, 189, 190, 607, 807, 806

(56) References Cited

U.S. PATENT DOCUMENTS

| | | | | |
|---|---|---|---|---|
| 5,512,945 A | * | 4/1996 | Sakurai et al. | 348/221 |
| 5,959,414 A | * | 9/1999 | Yoshida et al. | 315/382 |
| 5,969,757 A | * | 11/1999 | Okada et al. | 348/219 |
| 6,108,036 A | * | 8/2000 | Harada et al. | 348/219 |
| 6,195,125 B1 | * | 2/2001 | Udagawa et al. | 348/222 |
| 6,215,895 B1 | * | 4/2001 | Sali et al. | 382/141 |
| 6,226,397 B1 | * | 5/2001 | Yamagata et al. | 382/162 |

* cited by examiner

Primary Examiner—Bipin Shalwala
Assistant Examiner—Nitin Patel
(74) Attorney, Agent, or Firm—David N. Lathrop, Esq.; Gallagher & Lathrop

(57) ABSTRACT

There are provided a method and an apparatus for acquiring an image for inspection of a flat panel display which can be advantageously used in inspecting any pixel defect of a flat panel display with high accuracy. An image of light and darkness of the flat panel display picked up by a solid state image pickup element is converted into digital image data, and any moiré component is extracted from the image data to detect a period of the moiré component. Pixel values of data collected at the period of moiré from a data series in X-axis direction or Y-axis direction of the image data are connected to find a plurality of smoothed curves from which defect components have been eliminated. Differences between pixel values positioned on that plurality of smoothed curves and the original image data are found to obtain defect component image data, and an average of the plurality of smoothed curves is found to obtain smoothed image data containing no moiré. This smoothed image data and the defect component image data are added and the addition result is stored in an image memory as image data for inspection.

8 Claims, 15 Drawing Sheets

METHOD AND APPARATUS FOR ACQUIRING AN IMAGE FOR INSPECTION OF A FLAT PANEL DISPLAY

BACKGROUND OF THE INVENTION

1. Field of the Invention

The present invention relates to a method for acquiring an image for inspection of a flat panel display which can be advantageously used in inspecting a pixel defect, an uneven display or the like of a flat panel display such as, for example, a liquid crystal display (LCD), a plasma display (PDP) or the like, and to an apparatus for acquiring an image for inspection of such flat panel display using this method.

2. Description of the Related Art

An apparatus for inspecting quality of a picture or an image of a flat panel display (an image quality inspection apparatus for a flat panel display) such as a liquid crystal display, a plasma display or the like mainly comprises an inspection image acquisition apparatus for acquiring an image data for inspection, and an image quality inspection apparatus for inspecting whether or not any pixel defect (loss), an uneven display, or the like exists, using an image data acquired by this inspection image acquisition apparatus.

FIG. 17 is a block diagram showing a general construction of the portion of an inspection image acquisition apparatus in the image quality inspection apparatus for a flat panel display. As illustrated, this inspection image acquisition apparatus comprises a panel driver part 2 for driving a flat panel display (for example, a liquid crystal display) 8 to be inspected, a camera part 3 having a camera (for example, a CCD (charge coupled device) camera) therein for photographing (picking up as an image) a displayed image on the flat panel display 8, an analog-to-digital (AD) converter 4 for converting a photographed analog image signal from the camera part 3 into a digital signal, an image memory 7 for storing therein the converted digital image signal, a pre-sampling processing part 5 for pre-sampling the digital image signal and converting the pre-sampled digital image signal into an image data in which each pixel thereof has the same size as that of the display screen (panel) of the flat panel display 8, and a control part 1 for directly controlling the panel driver part 2 as well as controlling the AD converter 4, the pre-sampling processing part 5 and the image memory 7 via a bus (BUS).

The flat panel display 8 to be inspected displays on its panel a test image or picture having a predetermined light and darkness (shade) based on a driving signal outputted from the panel driver part 2 under the control of the control part 1 (usually constituted by a CPU). The light and darkness image of the flat panel display 8 is photographed (picked up as an image) by the camera (solid state image pickup element) of the camera part 3 to supply it to the AD converter 4. The analog image signal from the camera part 3 is converted by the AD converter 4 into digital pixel data of light and darkness (hereinafter, referred to as pickup pixel data), which is in turn temporarily stored in the image memory 7.

The pickup pixel data converted into a digital signal is pre-sampled by the pre-sampling processing part 5, and is converted into an image data in which each pixel thereof has the same size as that of the panel of the flat panel display 8. The converted image data is hereinafter referred to as pre-sampling image data or a display pixel data. The converted display pixel data is stored in the image memory 7. Further, since the method for converting pickup pixel data to pre-sampling image data is described in detail in Japanese Patent Applications (refer to Japanese Patent Application Laid Open No. Hei 8-29360 (29360/1996) and Japanese Patent Application Laid Open No. Hei 10-31730 (31730/1998)) previously proposed by the present applicants, reference should be made to those Japanese Patent Applications or Japanese Patent Application Laid Open Publications thereof. In addition, the descriptions of those Japanese Patent Applications are incorporated into the present specification.

In order to suppress the occurrence of any moiré in the display pixel data obtained by converting an analog image signal picked up by the camera part 3 into digital pickup pixel data and applying the pre-sampling processing to the pickup pixel data with higher accuracy, it is desired that the pixel magnification is an integer magnification such as two times or so. Here, the pixel magnification is defined as a ratio of the number of pixels of the panel of the flat panel display 8 to the number of pixels of the solid state image pickup element (for example, CCD element) of the camera part 3. As an example, the condition that one pixel of the panel of the flat panel display 8 is photographed or picked up by 2×2 pixels of the solid state image pickup element of the camera part 3 is said that the pixel magnification is two.

However, with the progress of a fine pitched and high precision flat panel display 8, and by a limitation of pixel size of the camera part 3 on the other side, there often occurs a case that the pixel magnification to be set is unavoidably set to a non-integer magnification less than 2.

When the pixel magnification is set to a non-integer magnification less than 2, a periodic pixel value fluctuation occurs in each of the pickup pixel data and the pre-sampling image data or display pixel data, the pickup pixel data being acquired by the camera part 3 and being converted into digital data, the display pixel data being obtained by applying a pre-sampling processing to the pickup pixel data. This periodic pixel value fluctuation is called moiré of image. FIG. 18 shows an example of the result obtained by that in case of setting the pixel magnification to 1.8, pixel values (each corresponding to brightness of a pixel) of the display pixel data acquired by the camera part 3 and stored in the image memory 7 are summed up, for the same X address (X address is defined as horizontal or lateral axis herein), in Y address direction (vertical or longitudinal axis direction). In FIG. 18, it is recognized that a moiré of approximately five-pixel period has occurred, that is, a moiré occurs approximately at intervals of five pixels. There is a problem that this moiré comes to a noise component, resulting in great decrease in the inspection accuracy of the flat panel display 8.

The moiré of an image has already occurred in the state that the distribution of light intensity of the flat panel display 8 is sampled by pixels of the image pickup element (for example, CCD) of the camera part 3. This is primarily caused by that the difference of relative position between a display pixel of the flat panel display 8 and a pixel of the image pickup element of the camera part 3 is reflected to the display pixel data (pre-sampling image data). Further, hereinafter, a pixel of the image pickup element of the camera part 3 is referred to as a pickup pixel, and a display pixel of the panel of the flat panel display 8 is referred to as a display pixel.

FIG. 19 shows an example of relative position between a pickup pixel and a display pixel in the case of the pixel magnification of 1.8. In this example, the pickup pixels are pixels of the CCD image pickup element, and the display pixels are display pixels of the panel of a liquid crystal display (LCD). Further, in this case, in order to simplify the explanation, the description will be given based on a one-dimensional signal.

Since the pixel magnification is 1.8, as shown in FIG. 19A, 9 pixels of the pickup pixels correspond to 5 pixels of the display pixels, and this positional relationship is periodically repeated. The sampling values G(n) (n is an integer from 1 to 10) (refer to FIG. 19C), in this case, sampled by the first to the tenth pickup pixels with respect to the periodic light intensity distribution g(x) (refer to FIG. 19B) of the display pixels are shown by the following equation (1).

$$\begin{aligned}G(1) &= \int_{x_0}^{x_1} g\!\left(x - \frac{x_0+x_2}{2}\right) dx \\ G(2) &= \int_{x_1}^{x_2} g\!\left(x - \frac{x_0+x_2}{2}\right) dx + \int_{x_2}^{x_3} g\!\left(x - \frac{x_2+x_5}{2}\right) dx \\ G(3) &= \int_{x_3}^{x_4} g\!\left(x - \frac{x_2+x_5}{2}\right) dx \\ G(4) &= \int_{x_4}^{x_5} g\!\left(x - \frac{x_2+x_5}{2}\right) dx + \int_{x_5}^{x_6} g\!\left(x - \frac{x_5+x_8}{2}\right) dx \\ G(5) &= \int_{x_6}^{x_7} g\!\left(x - \frac{x_5+x_8}{2}\right) dx \\ G(6) &= \int_{x_7}^{x_8} g\!\left(x - \frac{x_5+x_8}{2}\right) dx + \int_{x_8}^{x_9} g\!\left(x - \frac{x_8+x_{11}}{2}\right) dx \\ G(7) &= \int_{x_9}^{x_{10}} g\!\left(x - \frac{x_8+x_{11}}{2}\right) dx \\ G(8) &= \int_{x_{10}}^{x_{11}} g\!\left(x - \frac{x_8+x_{11}}{2}\right) dx + \int_{x_{11}}^{x_{12}} g\!\left(x - \frac{x_{11}+x_{13}}{2}\right) dx \\ G(9) &= \int_{x_{12}}^{x_{13}} g\!\left(x - \frac{x_{11}+x_{13}}{2}\right) dx \\ G(10) &= \int_{x_{13}}^{x_{14}} g\!\left(x - \frac{x_{13}+x_{15}}{2}\right) dx \end{aligned} \quad (1)$$

From the periodic nature of the relative position between a pickup pixel (CCD) and a display pixel (LCD), the positional relationship between the display pixel 6 and the pickup pixel 10 in FIG. 19A is equal to the positional relationship between the display pixel 1 and the pickup pixel 1. That is, since the positions of $x_{14}$ and $x_{15}$ relative to $X_{13}$ are equal to the positions of the $x_1$ and $x_2$ relative to $x_0$, the pixel value G(1) is equal to the pixel value G(10). Therefore, the sampling values by pickup pixels shown in FIG. 19C have nine patterns depending upon differences of the relative positions, and those nine patterns are repeated periodically. Those sampling values by pickup pixels become an output signal of the camera part 3. Accordingly, in the pickup image data which is a digital signal converted from the output signal, there occurs a moiré in which the nine patterns of the sampling values G(1)–G(9) periodically repeat.

Next, a case of pre-sampling the sampling values G(1)–G(9) by the pickup pixels in correspondence to the size of the display pixel will be discussed. The relationship between the sampling values G(1)–G(9) by the pickup pixels and the pre-sampling intervals is as shown in FIG. 19C. The area of the sampling value by the pickup pixel (CCD) in each of the pre-sampling intervals $x_0$–$x_2$, $x_2$–$x_5$, $x_5$–$x_8$, and $x_8$–$x_{11}$ becomes a pixel value of the display image data corresponding to the size of display pixel (LCD). Therefore, the pixel values f(n) (n is an integer from 1 to 6) corresponding to the first to the sixth display pixels by pre-sampling processing can be expressed by a next equation (2).

$$\begin{aligned} f(1) &= G(1) + \frac{x_2-x_1}{x_3-x_1} G(2) \\ f(2) &= \frac{x_3-x_2}{x_3-x_1} G(2) + G(3) + \frac{x_5-x_4}{x_6-x_4} G(4) \\ f(3) &= \frac{x_6-x_5}{x_6-x_4} G(4) + G(5) + \frac{x_8-x_7}{x_9-x_7} G(6) \\ f(4) &= \frac{x_9-x_8}{x_9-x_7} G(6) + G(7) + \frac{x_{11}-x_{10}}{x_{12}-x_{10}} G(8) \\ f(5) &= \frac{x_{12}-x_{11}}{x_{12}-x_{10}} G(8) + G(9) \\ f(6) &= G(10) + \frac{x_{15}-x_{14}}{x_{16}-x_{14}} G(11) \end{aligned} \quad (2)$$

Also in the equation (2), from the periodic nature of the relative position between the pickup pixel and the display pixel, f(1) is equal to f(6). As a result, the pixel values of a display pixel data corresponding to display pixels have five patterns, and those patterns are repeated. Consequently, it should be understood that when in the case that the pixel magnification is 1.8, a moiré occurs in the pre-sampling image data with a five-pixel period, that is, at intervals of five pixels. As mentioned above, there is a serious disadvantage that the moiré comes to a noise component, which results in great decrease in the inspection accuracy of the flat panel display 8.

SUMMARY OF THE INVENTION

It is an object of the present invention to provide an image acquisition method for inspection of a flat panel display which can eliminate any moiré component.

It is another object of the present invention to provide an image acquisition apparatus for inspection of a flat panel display using the above image acquisition method, which can be advantageously used in inspecting at high accuracy whether any defect exists in the flat panel display or not.

In order to accomplish the above objects, in a first aspect of the present invention, there is provided a method for acquiring an image for inspection of a flat panel display including the steps of: displaying an image for inspection on a flat panel display to be inspected, and picking up the inspection image by a solid state image pickup element to convert the pickup image signal to a digital signal, thereby to obtain pickup pixel data each pixel of which has a pixel value corresponding to the pixel size of said solid state image pickup element; and applying a pre-sampling processing to the pickup pixel data, thereby to obtain display pixel data each pixel of which has a pixel value corresponding to the pixel size of said flat panel display, and said method further including the steps of: storing the display pixel data in an image memory; obtaining a plurality of moiré component image data by detecting any moiré in respect to either direction of X-axis direction or Y-axis direction occurring in the display pixel data stored in said image memory, forming a plurality of data series, each data series being collected from the display pixel data at intervals of the number of pixels of the display pixel data corresponding to the occurrence period of the moiré, the number of said plurality of data series depending upon the number of pixels included within the occurring period of the moiré, and smoothing pixel values of each of the plurality of data series, thereby to obtain a plurality of moiré component image data from which defect components have been eliminated; taking a difference between the moiré component image data and the display pixel data to find defect component image data; storing the defect component image data in a defect component image memory; giving a pixel value to a pixel having no pixel value in each moire component image data by an interpolation operation, and finding a mutual average value of the plurality of the moiré component image data to obtain smoothed image data from which the moire has been eliminated; and storing the smoothed image data in a smoothed image memory. The defect component image data stored in said defect component image memory and the smoothed image data stored in said smoothed image memory are maintained as image data for inspection of the flat panel display.

According to the image acquisition method for inspection of a flat panel display of the above first aspect, in the case that the direction of the moiré occurrence is either one of the X-axis direction or the Y-axis direction, the smoothed image data from which the moiré has been eliminated and the defect component image data can be obtained. These data are separately stored in the associated memories respectively, and hence it is possible to send them to an image quality inspection apparatus for a flat panel display separately.

In a second aspect of the present invention, the step of obtaining a plurality of moiré component image data sequentially detects any moiré in respect to both the X-axis and the Y-axis directions, and obtains a plurality of moiré component image data from which defect components have been eliminated in respect to both the X-axis and the Y-axis directions.

According to the image acquisition method for inspection of a flat panel display of the above second aspect, even in the case that the direction of the moiré occurrence is both of the X-axis direction and the Y-axis direction, the smoothed image data from which the moiré has been eliminated and the smoothed image data can be obtained for each direction. These data are separately stored in the associated memories respectively, and hence it is possible to send them to an image quality inspection apparatus for a flat panel display separately.

In a preferred embodiment, the image acquisition method further includes a step of adding the defect component image data and the smoothed image data, and storing the addition result in said image memory as image data for inspection of the flat panel display.

In this embodiment, the defect component image data and the smoothed image data are added, and the addition result is stored in the common image memory. Consequently, the addition result of the smoothed image data and the defect component image data is to be sent to an image quality inspection apparatus for a flat panel display.

In a third aspect of the present invention, there is provided a method for acquiring an image for inspection of a flat panel display including the steps of: displaying an image for inspection on a flat panel display to be inspected, and picking up the inspection image by a solid state image pickup element to convert the pickup image signal to a digital signal, thereby to obtain pickup pixel data each pixel of which has a pixel value corresponding to the pixel size of said solid state image pickup element; and applying a pre-sampling processing to the pickup pixel data, thereby to obtain display pixel data each pixel of which has a pixel value corresponding to the pixel size of said flat panel display, and said method further including the steps of: storing the pickup pixel data in an image memory; obtaining a plurality of moiré component image data by detecting any moiré in respect to either direction of X-axis direction or Y-axis direction occurring in the pickup pixel data stored in said image memory, forming a plurality of data series, each data series being collected from the pickup pixel data at intervals of the number of pixels of the pickup pixel data corresponding to the occurrence period of the moiré, the number of said plurality of data series depending upon the number of pixels included within the occurring period of the moiré, and smoothing pixel values of each of the plurality of data series, thereby to obtain a plurality of moiré component image data from which defect components have been eliminated; taking a difference between the moiré component image data and the pickup pixel data to find defect component image data; storing the defect component image data in a defect component image memory; giving a pixel value to a pixel having no pixel value in each moiré component image data by an interpolation operation, and finding a mutual average value of the plurality of the moiré component image data to obtain smoothed image data from which the moiré has been eliminated; storing the smoothed image data in a smoothed image memory; adding the defect component image data stored in said defect component image memory and the smoothed image data stored in said smoothed image memory; and applying a pre-sampling processing to the image data obtained in said adding step to obtain display pixel data each pixel of which has a pixel value corresponding to the pixel size of the flat panel display. The display pixel data obtained in said step of applying a pre-sampling processing is maintained as image data for inspection of the flat panel display.

According to the image acquisition method for inspection of a flat panel display of the above third aspect, before the pre-sampling processing is applied, any moiré in either one of the X-axis direction or the Y-axis direction is removed from the pickup pixel data, and thereafter the smoothed image data from which the moiré has been eliminated and the defect component image data are obtained. These data are summed up and the pre-sampling processing is applied to the summed image data to convert into the display pixel data each having the display pixel size. Accordingly, the display pixel data is to be sent to an image quality inspection apparatus for a flat panel display separately.

In a fourth aspect of the present invention, said step of obtaining a plurality of moiré component image data sequentially detects any moiré in respect to both the X-axis and the Y-axis directions, and obtains a plurality of moiré component image data from which defect components have been eliminated in respect to both the X-axis and the Y-axis directions.

According to the image acquisition method for inspection of a flat panel display of the above fourth aspect, before the pre-sampling processing is applied, any moirés in both directions of the X-axis direction and the Y-axis direction are removed from the pickup pixel data.

In a preferred embodiment, the method further includes the step of storing the display pixel data obtained in the step of applying a pre-sampling process in said image memory as image data for inspection of the flat panel display.

In a fifth aspect of the present invention, there is provided an apparatus for acquiring an image for inspection of a flat panel display comprising: a panel driver part for supplying a driving signal to a flat panel display to be inspected to display a predetermined test image on said flat panel display to be inspected; a camera part for picking up the test image displayed on said flat panel display as image data of light and darkness; an analog-to-digital converter for converting an output signal of said camera part into pickup pixel data constructed by digital image data of light and darkness; a pre-sampling processing part for applying a pre-sampling processing to the digital pickup pixel data to obtain display pixel data each pixel of which has a pixel value corresponding to the pixel size of the flat panel display; a moiré elimination processing part for eliminating any moiré occurring in the display pixel data obtained in said pre-sampling processing part; an image memory for storing therein the display pixel data from which the moiré has been eliminated by said moiré elimination processing part; and a control part for performing a sending/receiving control of data or driving control in each of the elements except said camera part.

In a preferred embodiment, said moiré elimination processing part comprises: a defect elimination processing part for smoothing pixel values of data collected, from a data series in either of the X-axis direction or the Y-axis direction of the display pixel data obtained in said pre-sampling processing part, at an interval corresponding to the occurring period of the moiré, thereby to obtain moiré component image data from which any defect component has been eliminated; a moiré component image memory for storing therein the moiré component image data produced by said defect elimination processing part; a difference processing part for taking a difference between the display pixel data and the moiré component image data to obtain defect component image data; a defect component image memory for storing therein the defect component image data obtained in said difference processing part; an averaging process part for averaging the moiré component image data stored in said moiré component image memory mutually in respect to the data series in the X-axis direction or the Y-axis direction which is the same direction as that of said defect elimination processing part, thereby to obtain smoothed image data from which the moiré components have been eliminated; and a smoothed image memory for storing therein the smoothed image data obtained in said averaging process part.

In an another preferred embodiment, said defect elimination processing part further includes an addition processing part for adding the smoothed image data stored in said smoothed image memory and the defect component image data stored in said defect component image memory.

In addition, said defect elimination processing part is constructed such that a defect eliminating process in the X-axis direction is first performed and then a defect eliminating process in Y-axis direction is performed, thereby to eliminate moirés occurring in both the X-axis and the Y-axis directions. Alternatively, said defect elimination processing part may be constructed such that a defect eliminating process in the Y-axis direction is first performed and then a defect eliminating process in the X-axis direction is performed, thereby to eliminate moirés occurring in both the X-axis and the Y-axis directions.

According to the image acquisition apparatus for inspection of a flat panel display of the above fifth aspect, the image acquisition methods for inspection of a flat panel display of the first and the second aspects of the present invention can be carried out.

In a sixth aspect of the present invention, there is provided an apparatus for acquiring an image for inspection of a flat panel display comprising: a panel driver part for supplying a driving signal to a flat panel display to be inspected to display a predetermined test image on said flat panel display to be inspected; a camera part for picking up the test image displayed on said flat panel display as image data of light and darkness; an analog-to-digital converter for converting an output signal of said camera part into pickup pixel data constructed by digital image data of light and darkness; a moiré elimination processing part for eliminating any moiré produced in the digital pickup pixel data; an image memory for storing therein the pickup pixel data from which the moiré has been eliminated by said moiré elimination processing part; a pre-sampling processing part for applying a pre-sampling process to the pickup pixel data from which the moiré has been eliminated read out from said image memory, thereby to obtain display pixel data each pixel of which has a pixel value corresponding to the pixel size of the flat panel display; and a control part for performing a sending/receiving control of data or driving control in each of the elements except said camera part.

In a preferred embodiment, said moiré elimination processing part comprises: a defect elimination processing part for smoothing pixel values of data collected, from a data series in either of the X-axis direction or the Y-axis direction of pickup pixel data outputted from said analog-to-digital converter, at an interval corresponding to the occurring period of the moiré, thereby to obtain moiré component image data from which any defect component has been eliminated; a moiré component image memory for storing therein the moiré component image data obtained in said defect elimination processing part; a difference processing part for taking the difference between the pickup pixel data and the moiré component image data to obtain defect component image data; a defect component image memory for storing therein defect component image data obtained in said difference processing part; an averaging process part for averaging the moiré component image data stored in said moiré component image memory mutually in respect to the data series in the X-axis direction or the Y-axis direction which is the same direction as that of said defect elimination processing part, thereby to obtain smoothed image data from which the moiré component has been eliminated; a smoothed image memory for storing therein the smoothed image data obtained in said averaging process part; and an addition processing part for adding the smoothed image data stored in said smoothed image memory and the defect component image data stored in said defect component image memory. The pre-sampling processing part applies a pre-sampling process to the image data added in said addition processing part to obtain display pixel data each pixel of which has a pixel value corresponding to the pixel size of the flat panel display.

In an another preferred embodiment, said defect elimination processing part is constructed such that a defect eliminating process in the X-axis direction is first performed and then a defect eliminating process in the X-axis direction is performed, thereby to eliminate moirés occurring in both the X-axis and the Y-axis directions. Alternatively, said defect elimination processing part may be constructed such that a defect eliminating process in the Y-axis direction is first performed and then a defect eliminating process in the X-axis direction is performed, thereby to eliminate moirés occurring in both the X-axis and the Y-axis directions.

According to the image acquisition apparatus for inspection of a flat panel display of the above sixth aspect, the image acquisition methods for inspection of a flat panel display of the third and the fourth aspects of the present invention can be carried out.

DETAILED DESCRIPTION OF THE PREFERRED EMBODIMENTS

Figure 1:
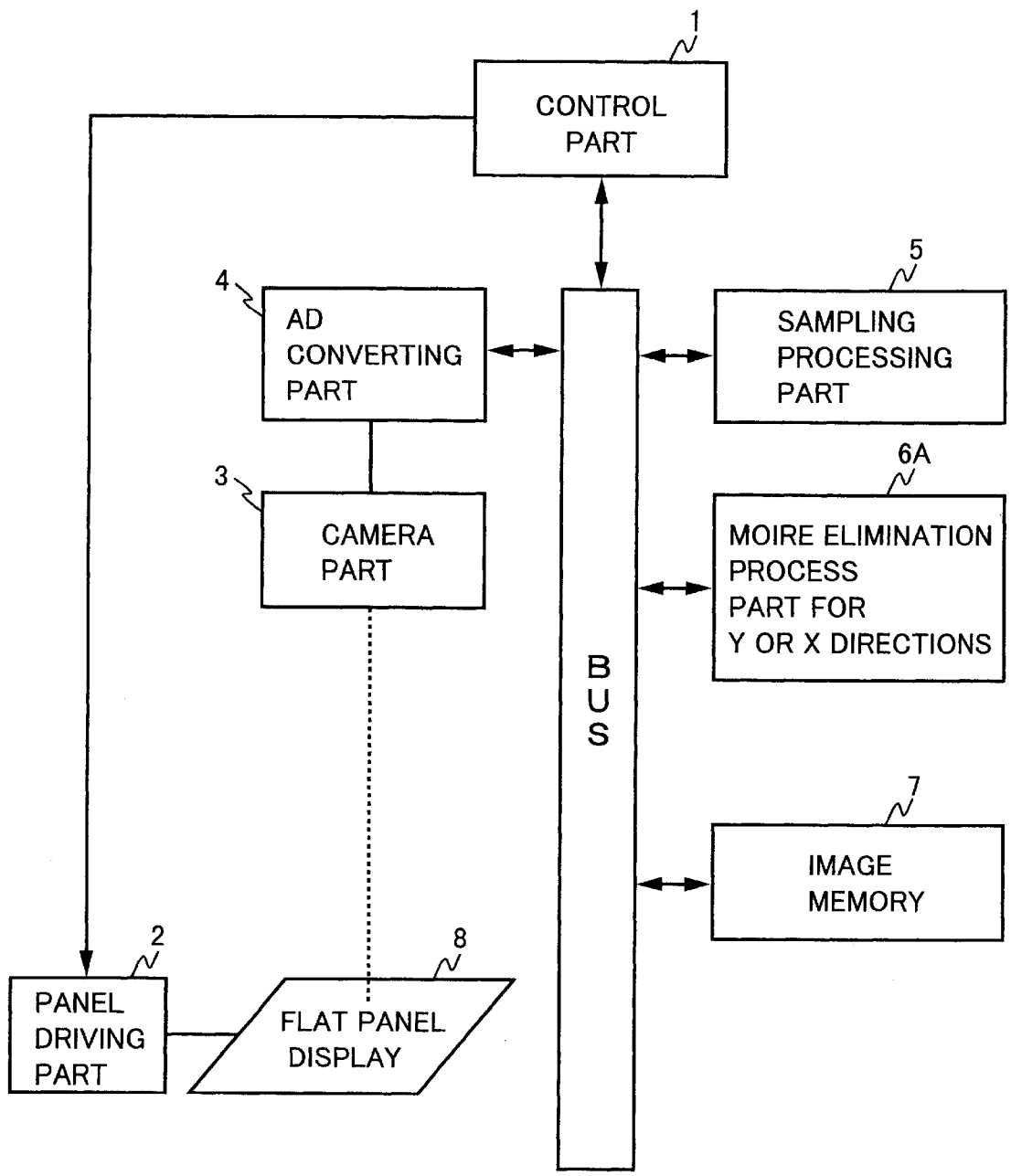
FIG. 1 is a block diagram showing a first embodiment of the image acquisition apparatus for inspection of a flat panel display according to the present invention.

Now, the present invention will be described in respect to several preferred embodiments in detail with reference to FIGS. 1 to 16. Further, the portions or elements in FIGS. 1 and 4 corresponding to those in FIG. 17 are shown by the same reference characters affixed thereto, and the description thereof will be omitted unless it is necessary.

FIG. 1 is a block diagram showing a first embodiment of the image acquisition apparatus for inspection of a flat panel display according to the present invention. Particularly, FIG. 1 shows a configuration of the portion to which the method for acquiring an image for inspection of a flat panel display according to the present invention relates. Similarly to the conventional image acquisition apparatus shown in FIG. 17, the image acquisition apparatus of the first embodiment comprises a panel driver part 2 for driving a flat panel display (for example, a liquid crystal display) 8 to be inspected, a camera part 3 having a camera (for example, a CCD camera) for photographing or picking up a displayed image on the flat panel display 8, an analog-to-digital (AD) converter 4 for converting an analog pickup image signal from the camera part 3 into a digital signal, an image memory 7 for storing therein the pickup image signal which has been converted into a digital signal, a pre-sampling processing part 5 for applying a pre-sampling processing to the digital pickup image signal to convert it into image data each pixel of which has the same size as the pixel size of the panel of the flat panel display 8, and a control part 1 for directly controlling the panel driver part 2 as well as controlling the AD converter 4, the pre-sampling processing part 5 and the image memory 7 via a bus (BUS).

Moreover, in this first embodiment, there is provided a moiré elimination processing part 6A for eliminating any moiré in either one direction of Y-axis direction or X-axis direction from the digital pickup image signal (display pixel data) stored in the image memory 7. This moiré elimination processing part 6A is also controlled by the control part 1 via the bus BUS.

The control part 1 is usually constructed by a CPU (central processing unit), and performs a sending/receiving control of the data or a driving control in all the elements excluding the camera part 3. The panel driver part 2 supplies, in response to a control signal from the control part 1, a driving signal to the flat panel display 8, whereby the flat panel display 8 displays on its panel a test image having an image of predetermined light and darkness (or shade). This image of light and darkness on the flat panel display 8 is picked up by the solid state camera of the camera part 3 and is supplied from the camera part 3 to the AD converter 4 which in turn converts the pickup image signal into digital pixel data of light and darkness (hereinafter, referred to as pickup pixel data). This pickup pixel data is temporarily stored in the image memory 7.

The pre-sampling processing part 5 applies a pre-sampling processing to the pickup pixel data which has been converted into a digital signal to convert it into image data each pixel of which has the same size as the pixel size of the panel of the flat panel display 8. This converted image data is referred to as pre-sampling image data or display pixel data. In the first embodiment, a pre-sampling processing is applied to the pickup pixel data already stored in the image memory 7. The converted display pixel data is stored in the image memory 7.

The image memory 7 stores a digital pickup pixel data outputted from the AD converter 4, display pixel data obtained by application of the pre-sampling processing, and a smoothed curve I(n), moiré component image data f(n), defect component image data J(n), smoothed image data F(n), and the like in their respective storage areas. The smoothed curve I(n), the moiré component image data f(n), the defect component image data J(n), and the smoothed image data F(n) will be described later.

The moiré elimination processing part 6A for eliminating any moiré occurring in the Y-axis direction or the X-axis direction is a device for performing a process of eliminating any moiré occurring in the Y-axis direction or the X-axis direction in the digital pickup pixel data or in the display pixel data obtained by application of the pre-sampling processing to the digital pickup pixel data. As mentioned above, however, in the first embodiment, the moiré elimination processing part 6A operates to eliminate any moiré occurring in the Y-axis direction or the X-axis direction in the display pixel data obtained by application of the pre-sampling processing to the digital pickup pixel data. An example of the construction of the moiré elimination processing part 6A is shown in FIG. 2.

Figure 2:
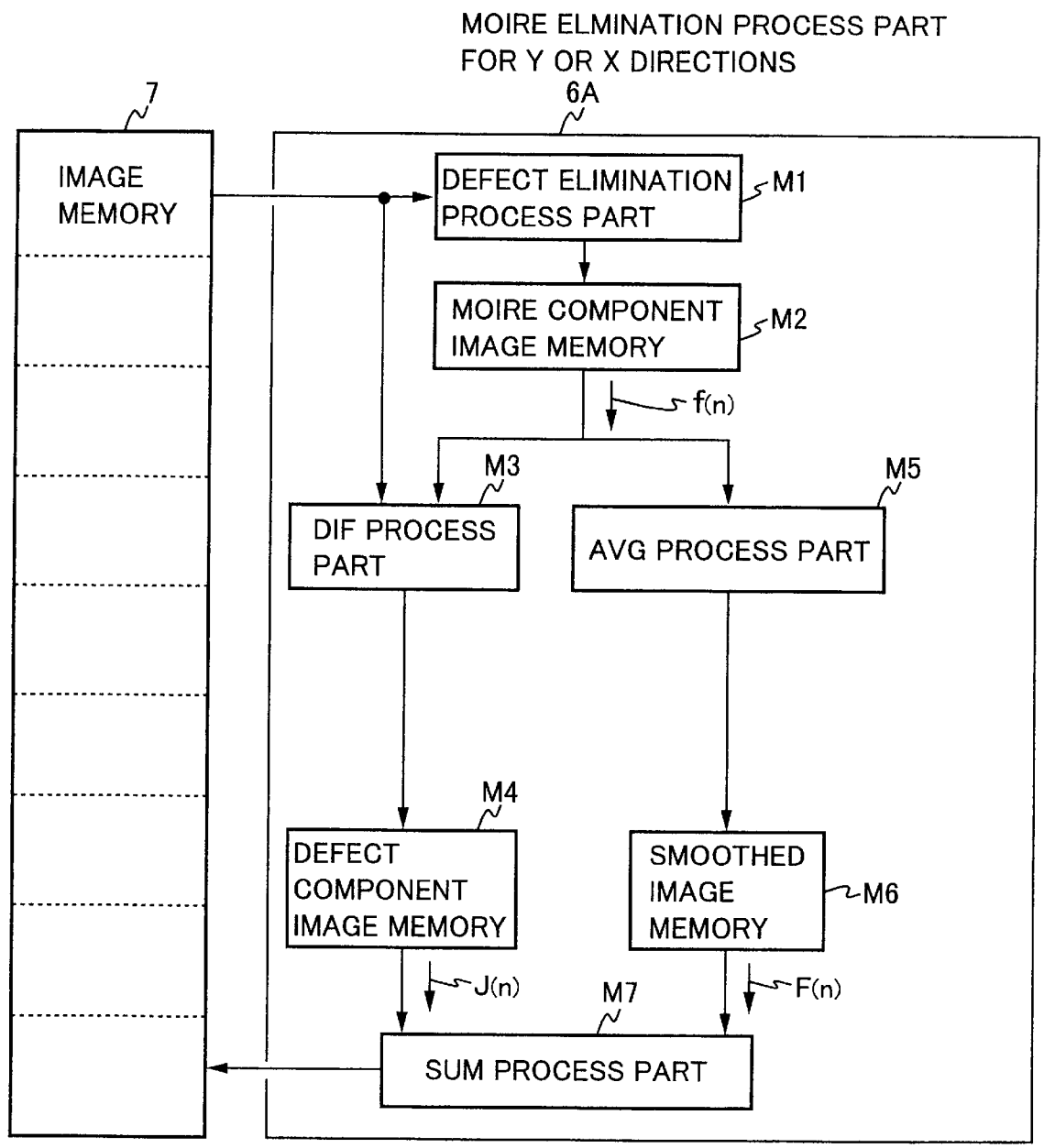
FIG. 2 is a block diagram showing an example of the internal construction of a moiré elimination processing part used in the image acquisition apparatus shown in FIG. 1.

The moiré elimination processing part 6A shown in FIG. 2 is a moiré elimination processing part used respectively in the image acquisition apparatus and the image acquisition method of the first embodiment, and hence the moiré elimination processing part 6A is used in the case that the occurrence of moiré is limited to one direction, namely to either one of the Y-axis direction or the X-axis direction. The illustrated moiré elimination processing part 6A comprises a defect elimination processing part M1 for eliminating any defect component, for each pixel series in the longitudinal direction Y-axis direction) or in the lateral direction (X-axis direction), from the display pixel data read out from the image memory 7, thereby to find moiré component image data, a moiré component image memory M2 for storing therein moiré component image data produced by the defect elimination processing part M1, a difference processing part M3 for taking a difference between the display pixel data (FIG. 9) obtained by the pre-sampling processing and the moiré component image data read out from the moiré component image memory M2 to find defect component image data, a defect component image memory M4 for storing therein the defect component image data produced by the difference processing part M3, an averaging process part M5 for applying an averaging process to the moiré component image data read out from the moiré component image memory M2, for each pixel series in the same direction as the direction of eliminating the defect component in the defect elimination processing part M1, thereby to obtain smoothed image data from which the moiré component has been eliminated, a smoothed image memory M6 for storing therein the smoothed image data produced by the averaging process part M5, and an addition processing part M7 for adding the defect component image data read out from the defect component image memory M4 and the smoothed image data read out from the smoothed image memory M6 from which the moiré component has been eliminated. The image data obtained by the adding process of the addition processing part M7 is stored in the image memory 7 as image data for inspection.

Further, the defect component image data and the smoothed image data may be directly outputted from the defect component image memory M4 and the smoothed image memory M6, respectively, as the image data for inspection.

Here, a basic concept of the present invention will be described.

The moiré elimination processing part 6A for the X-axis direction or the Y-axis direction constructed as described above and used in the first embodiment of the image acquisition apparatus and the image acquisition method for inspection of a flat panel display according to the present invention eliminates any defect components by finding a period of pixels at which a moiré occurs, and connects pixel values in accordance with the found pixel period, that is, carrying out a well-known median process at intervals of the moiré period.

Figure 9:
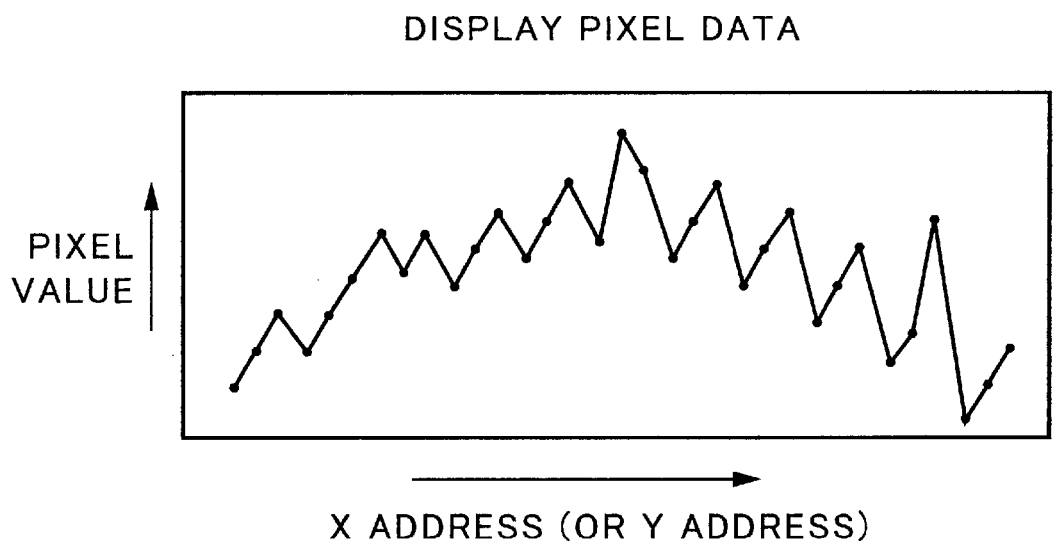
FIG. 9 is a graph for explaining an example of the moiré occurring state when a conventional image acquisition method for inspection of a flat panel display is used.
Figure 10:
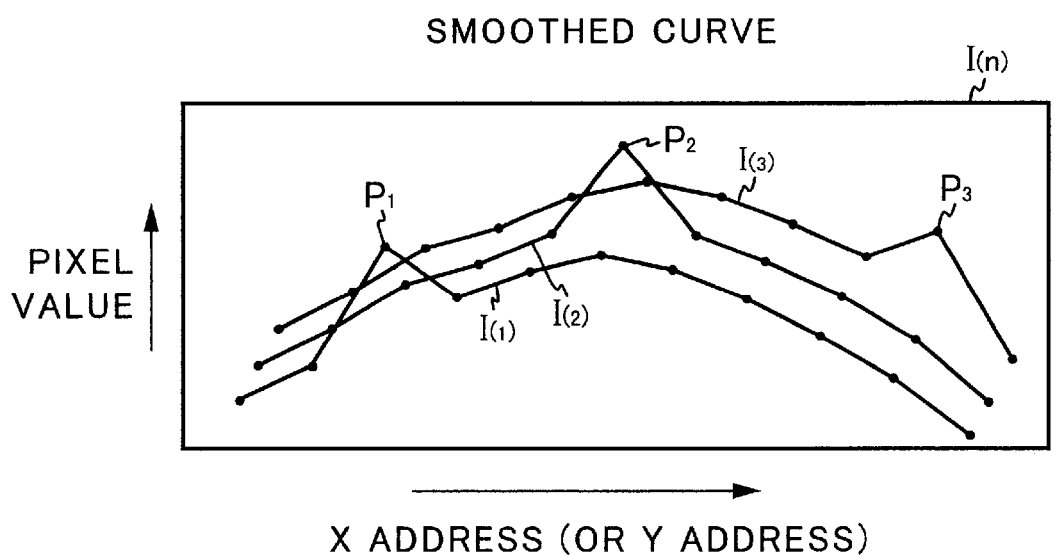
FIG. 10 is a graph showing a smoothed curve obtained by the method of the present invention from the curve shown in FIG. 9.

FIG. 9 is a diagram showing an example of the display pixel data series of an image the moiré period of which corresponds to three pixels (each pixel corresponds to the display pixel size) and having a defect component and/or a shading component. With respect to the display pixel data series dynamically fluctuating due to the moiré, relatively smooth curves I(1), I(2) and I(3) can be obtained, as shown in FIG. 10, by connecting data in the display pixel data series at intervals of three pixels which is the same as the moiré period (by reading out the display pixel data from the image memory 7 at every three addresses). Therefore, when a median filtering is applied thereto at intervals of the moiré period, the defect components $P_1$, $P_2$ and $P_3$ can effectively be removed from the smoothed curves I(1), I(2) and I(3) shown in FIG. 10, respectively.

Assuming that a display pixel data series (it may be either one of the X-axis direction or the Y axis direction) having a moiré occurring at intervals of m (the moiré period of m) be I(n) (n is a sequential number given to each pixel in the pixel series), the moiré component image data f(n) obtained, after the defect component elimination process, by the defect elimination processing part M1 of the moiré elimination processing part 6A can be expressed by the following equation (3).

$$f(n)=\text{med}[I(n-mw), I\{n-m(w-1)\}, I\{n-m(w-2)\}, \ldots,$$
$$I(n), I(n+m), \ldots, I\{n+m(w-1)\}, I(n+mw)] \quad (3)$$

In this case, med[ ] is an operation for obtaining a median value of data, and $I(n-mw)$, $I\{n-m(w-1)\}$, $I\{n-m(w-2)\}, \ldots, I(n), I(n+m), \ldots, I\{n+m(w-1)\}$, and $I(n+mw)$ are W (W is an odd number) data arranged at intervals of m pixels relative to I(n) as its center. In addition, w is a number given by the following equation (4).

$$w = \frac{W-1}{2} \quad (4)$$

Figure 11:
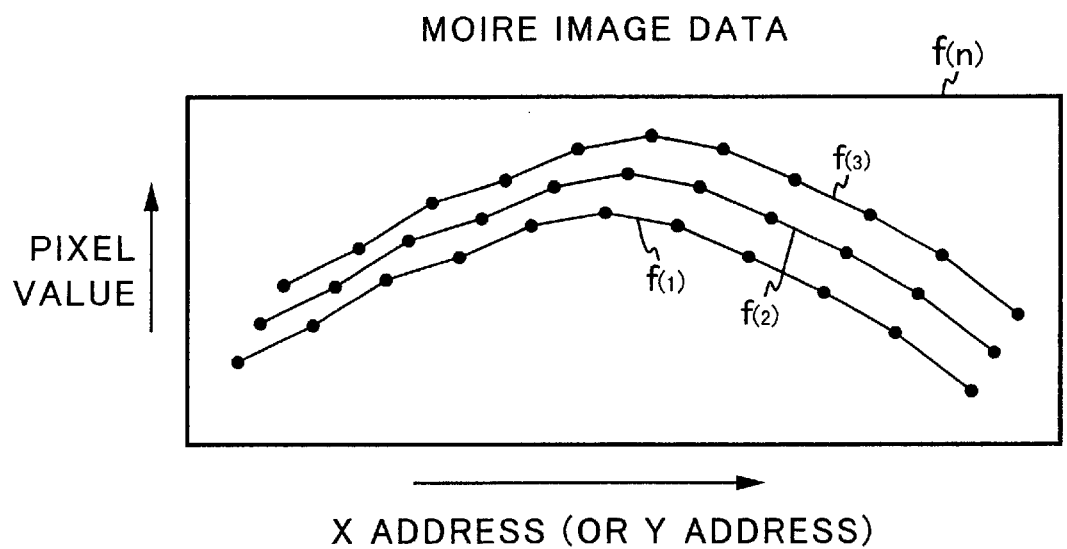
FIG. 11 is a graph showing a state that defect components have been eliminated from the smoothing curves shown in FIG. 10.

FIG. 11 shows a conceptual diagram of the moiré component image data f(n) obtained by the defect elimination processing part M1. In the conceptual diagrams shown in FIGS. 10 and 11, in the case of eliminating the moiré produced in the Y-axis direction, data are collected and arranged in the X address direction at intervals of the moiré period to eliminate the defect components $P_1$, $P_2$, and $P_3$. On the other hand, in the case of eliminating the moiré produced in the X-axis direction, data are collected and arranged in the Y address direction at intervals of the moiré period to eliminate the defect components $P_1$, $P_2$, and $P_3$.

In the difference processing part M3 of the moiré elimination processing part 6A, the defect component image data J(n) is obtained by taking a difference between the original image data I(n) and the moiré component image data f(n) from which the defect components have been eliminated. The defect component image data J(n) is expressed by the following equation (5).

$$J(n)=I(n)-f(n) \quad (5)$$

Figure 12:
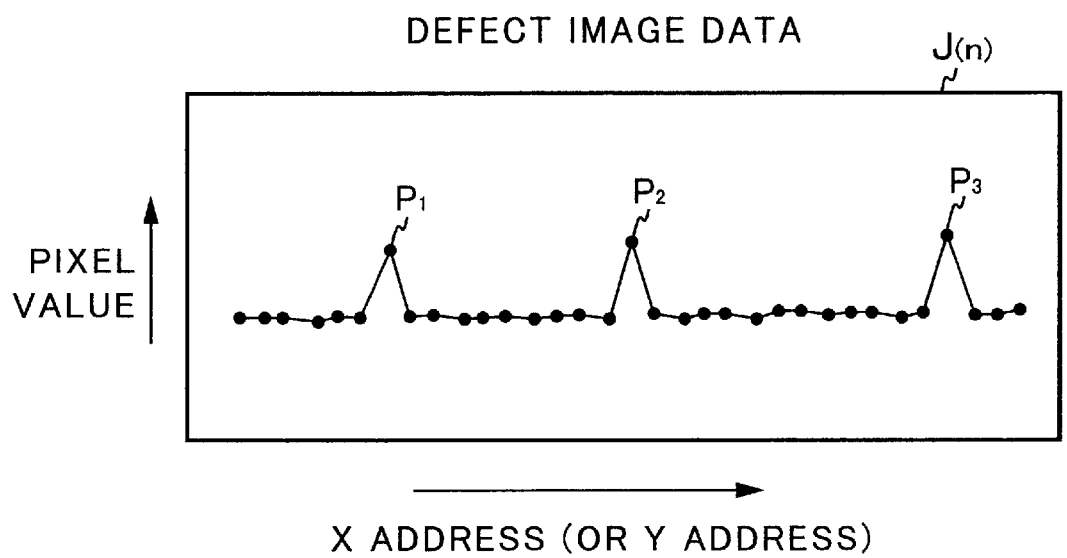
FIG. 12 is a graph for explaining a concept of defect image data obtained by a difference processing part used in the moiré elimination processing part of the image acquisition apparatus for inspection of a flat panel display according to the present invention.

FIG. 12 shows a conceptual diagram of the defect component image data J(n) obtained by the difference processing part M3.

In the averaging process part MS of the moiré elimination processing part 6A, there is utilized the fact that the number of kinds of the relative positions between the pickup pixels (CCD) and the display pixels (LCD) is equal to the number of pixels contained within the moiré period. With respect to all of the pixels of the moiré component image data f(n) obtained by the defect elimination processing part M1, a pixel value at each relative position is obtained by an interpolation procedure. By averaging those pixel values obtained by the interpolation procedure in respect to the same address, the periodicity depending on the relative position of pixel values is eliminated, and hence the moiré is eliminated.

Figure 13:
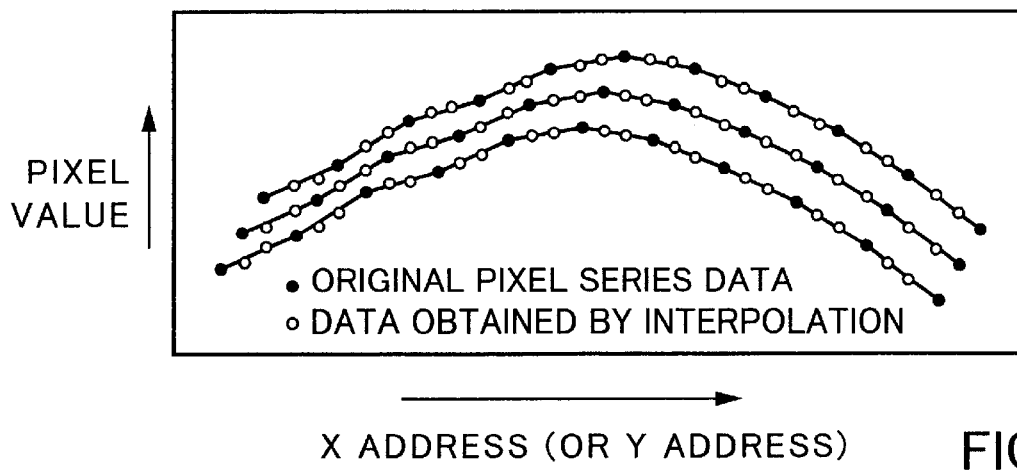
FIG. 13 is a graph for explaining a state of an interpolation process performed in the moiré elimination processing part of the image acquisition apparatus for inspection of a flat panel display according to the present invention.

FIG. 13 shows an example of the pixel values each being obtained by an interpolation procedure for each relative position of all of the pixels with respect to the moiré component image data f(n) shown in FIG. 11 from which the defect components have been eliminated. In FIG. 13, a black circle (●) indicates a pixel value of the original pixel data series, and a white circle (○) indicates a pixel value at each relative position obtained by the interpolation method. By averaging the pixel values at all of the relative positions (the same address) for each pixel, a pixel value containing no moiré is determined.

At present, if it is assumed that the moiré period is m pixels, and the moiré component image data containing the moiré is f(n), the smoothed image data F(n) obtained by the averaging process of the averaging process part M5 can be expressed by the following equation (6).

$$F(n) = \sum_{i=1}^{m} \left\{ \frac{i}{m} f(n+i-m) + \frac{m-i}{m} f(n+i) \right\} \quad (6)$$

Figure 14:
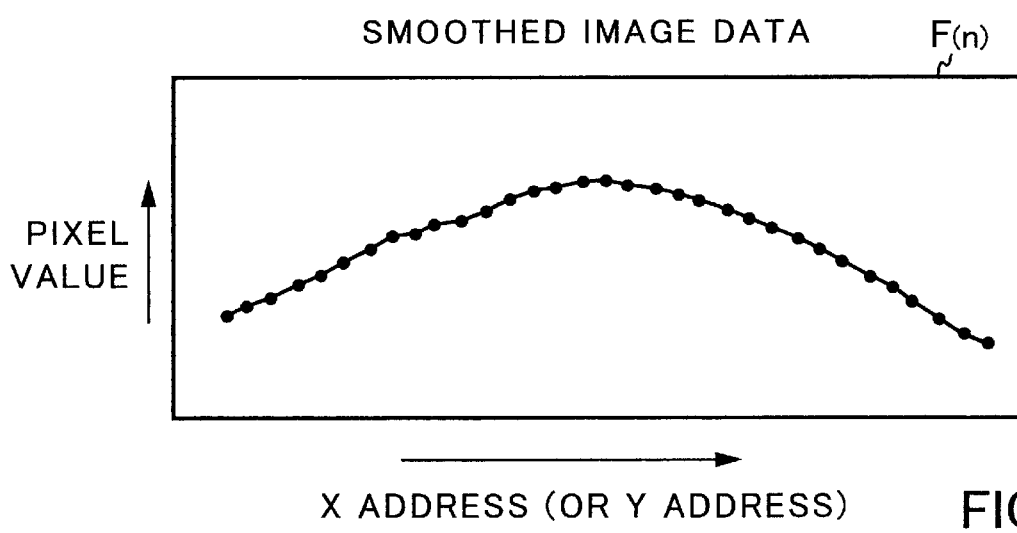
FIG. 14 is a graph for explaining a concept of smoothed image data obtained by applying an averaging process to the curves shown in FIG. 13.

FIG. 14 shows a conceptual diagram of the smoothed image data F(n) obtained by the averaging process.

In the addition processing part M7 of the moiré elimination processing part 6A, the smoothed image data F(n) from which the moiré has been eliminated and the defect component image data J(n) are summed to obtain an image data for inspection H(n). This image data for inspection H(n) is expressed by the following equation (7).

$$H(n)=F(n)+J(n) \quad (7)$$

Figure 15:
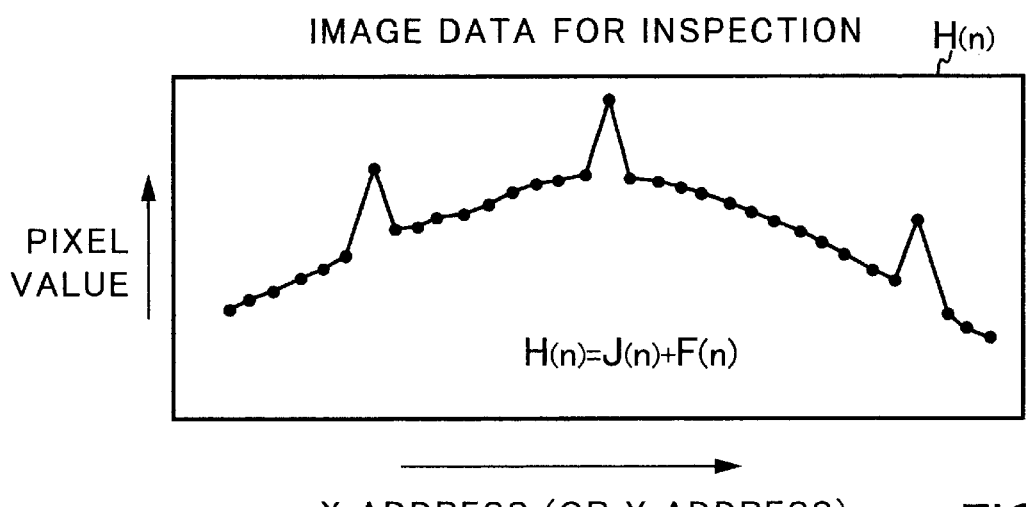
FIG. 15 is a graph for explaining a concept of image data for inspection obtained by the image acquisition method for inspection of a flat panel display according to the present invention.

FIG. 15 shows a conceptual diagram of the image data for inspection H(n) obtained by the addition processing part M7.

Figure 16:
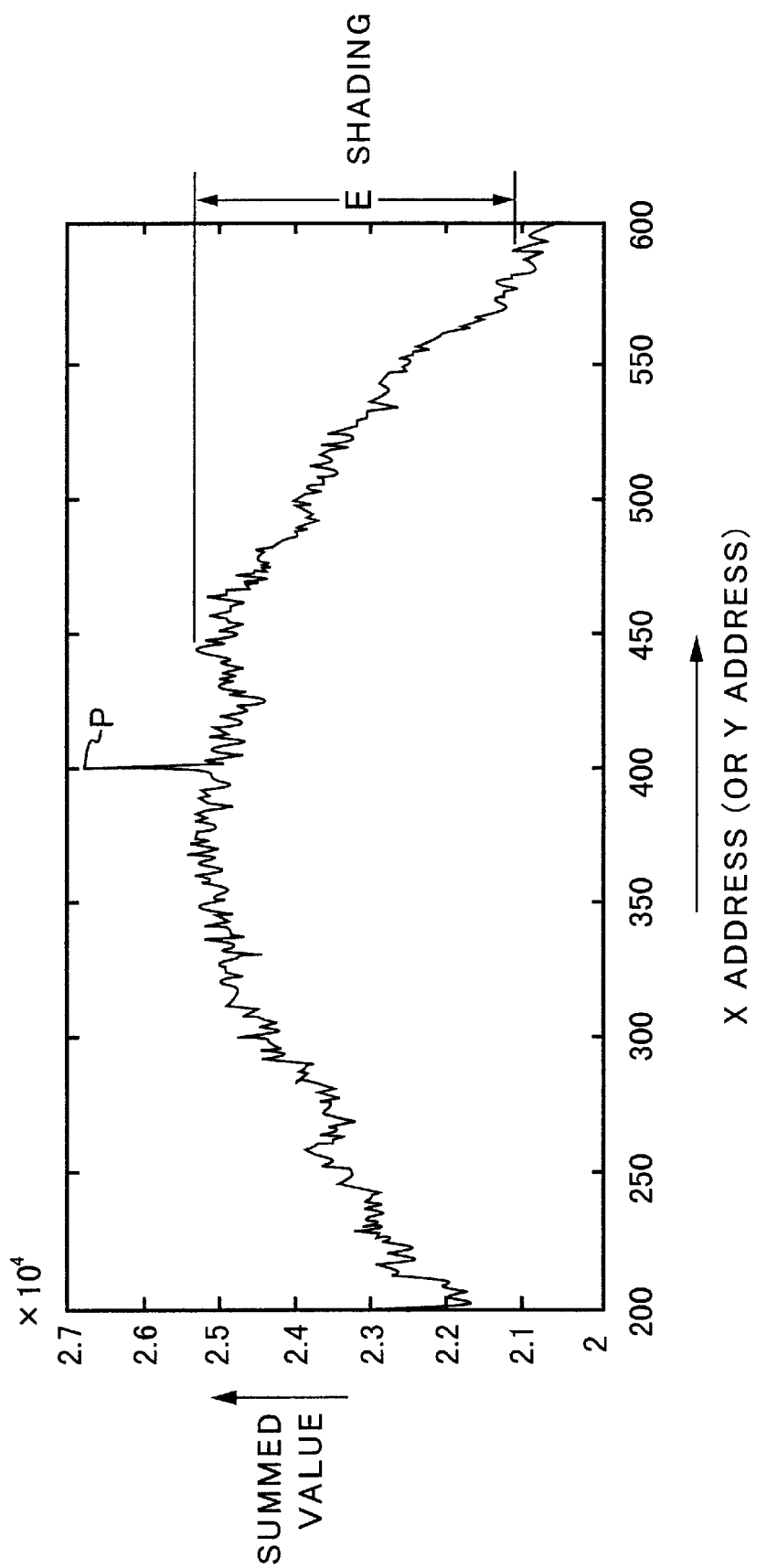
FIG. 16 is a waveform showing a state of image data for inspection obtained by the image acquisition method for inspection of a flat panel display according to the present invention.
Figure 17:
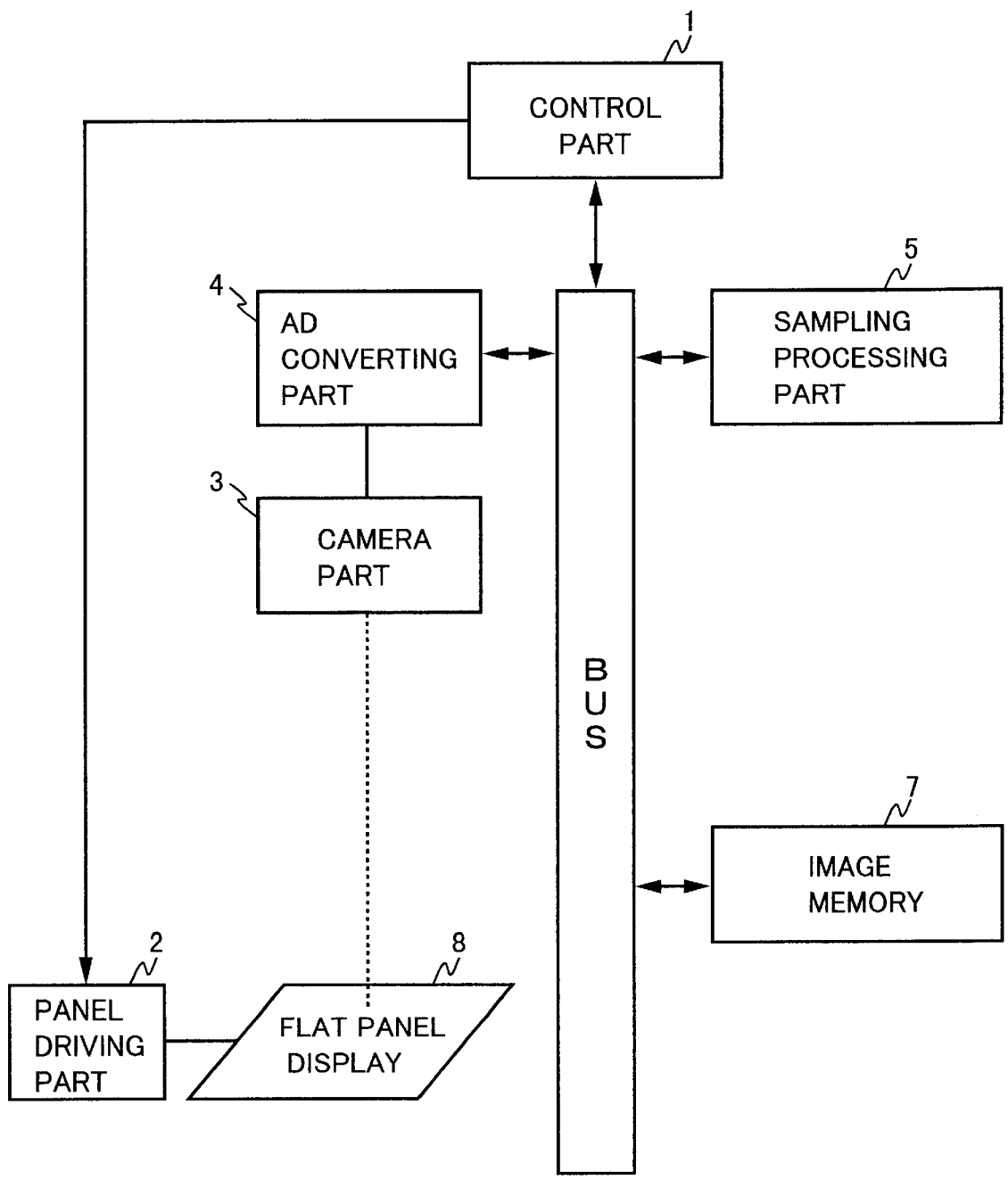
FIG. 17 is a block diagram showing an example of the conventional image acquisition apparatus for inspection of a flat panel display.
Figure 18:
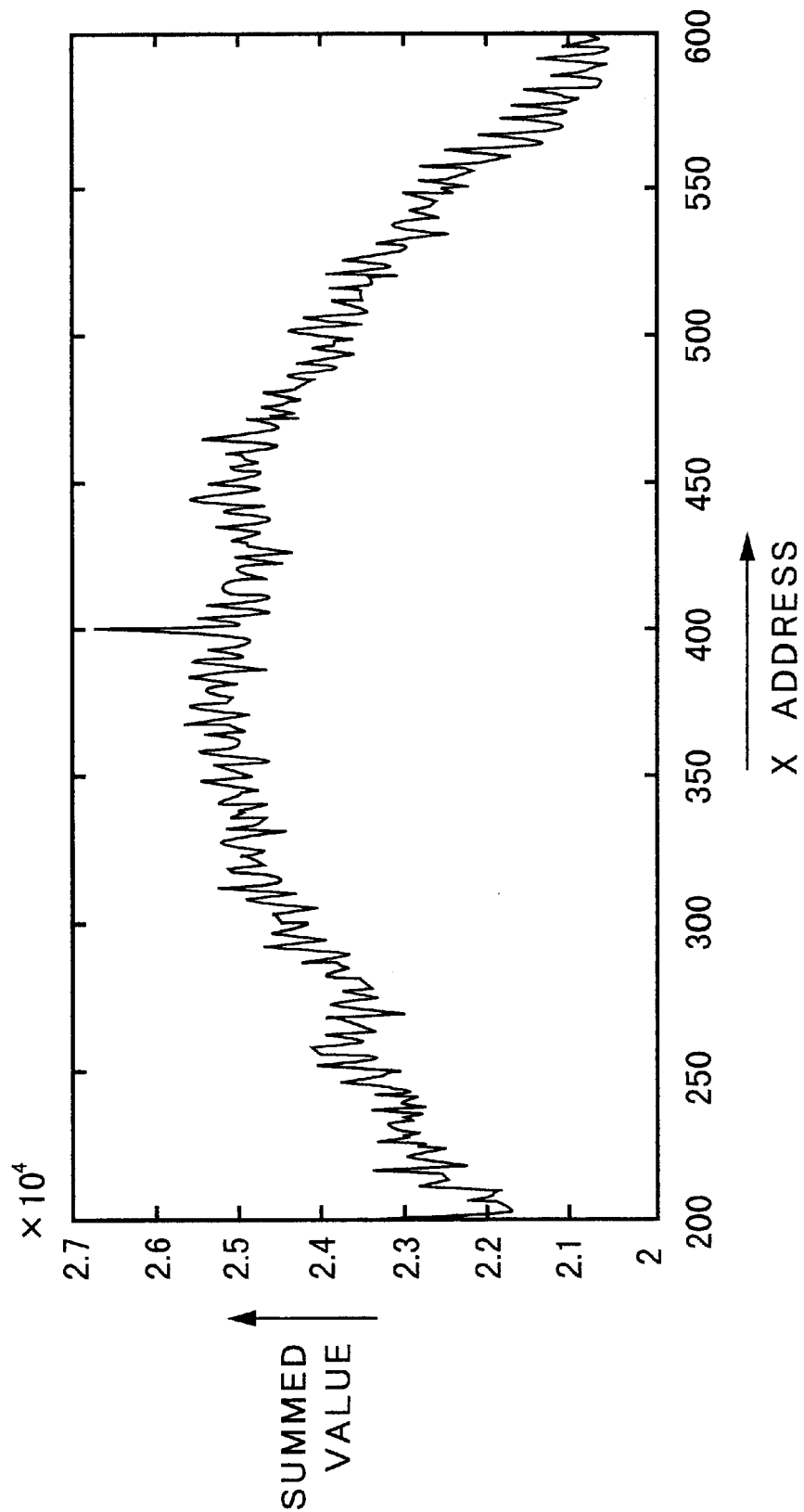
FIG. 18 is a waveform for explaining disadvantages of the conventional image acquisition apparatus shown in FIG. 17.
Figure 19:
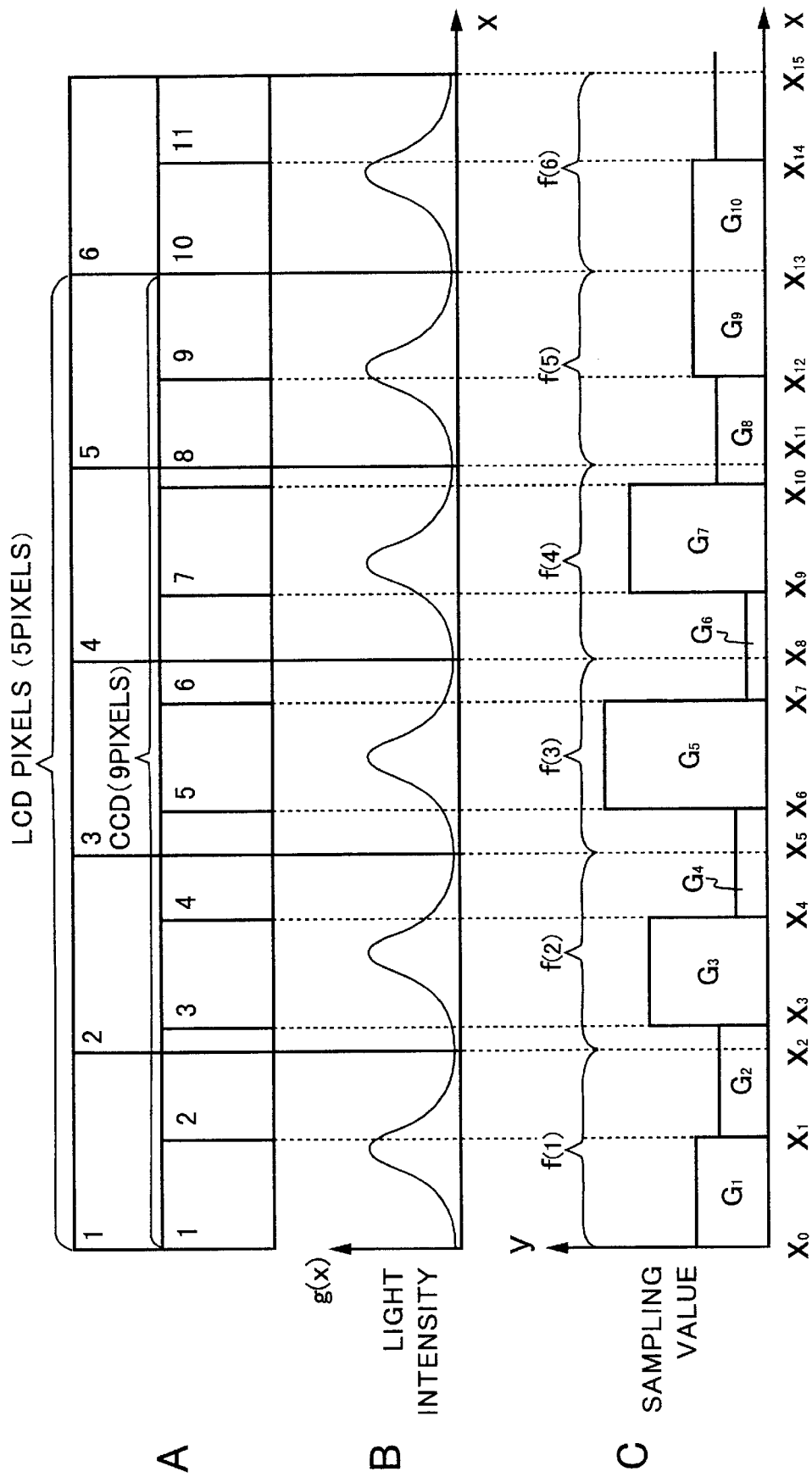
FIG. 19 is a diagram for explaining a relationship between LCD pixels and CCD pixels in the case that the pixel magnification is 1.8.

FIG. 16 shows a waveform obtained by applying the moiré eliminating process used in the aforementioned apparatus for acquiring an image of the first embodiment of the present invention and the first embodiment of the method for acquiring an image of the present invention to be described later to the image data providing the waveform shown in FIG. 18, and by summing the pixel values of the image data obtained as a result of the application of the moiré eliminating process in the longitudinal direction (Y address direction of the image memory 7). According to the present invention, it is understood from the waveform of FIG. 16 that there is a pixel value fluctuation due to a random noise of the image data, but the defect component P and the shading component E are maintained, and hence the moiré is preferably reduced.

Next, the first embodiment of the image acquisition method for inspection of a flat panel display according to the present invention will be described in detail with reference to FIG. 3.

Figure 3:
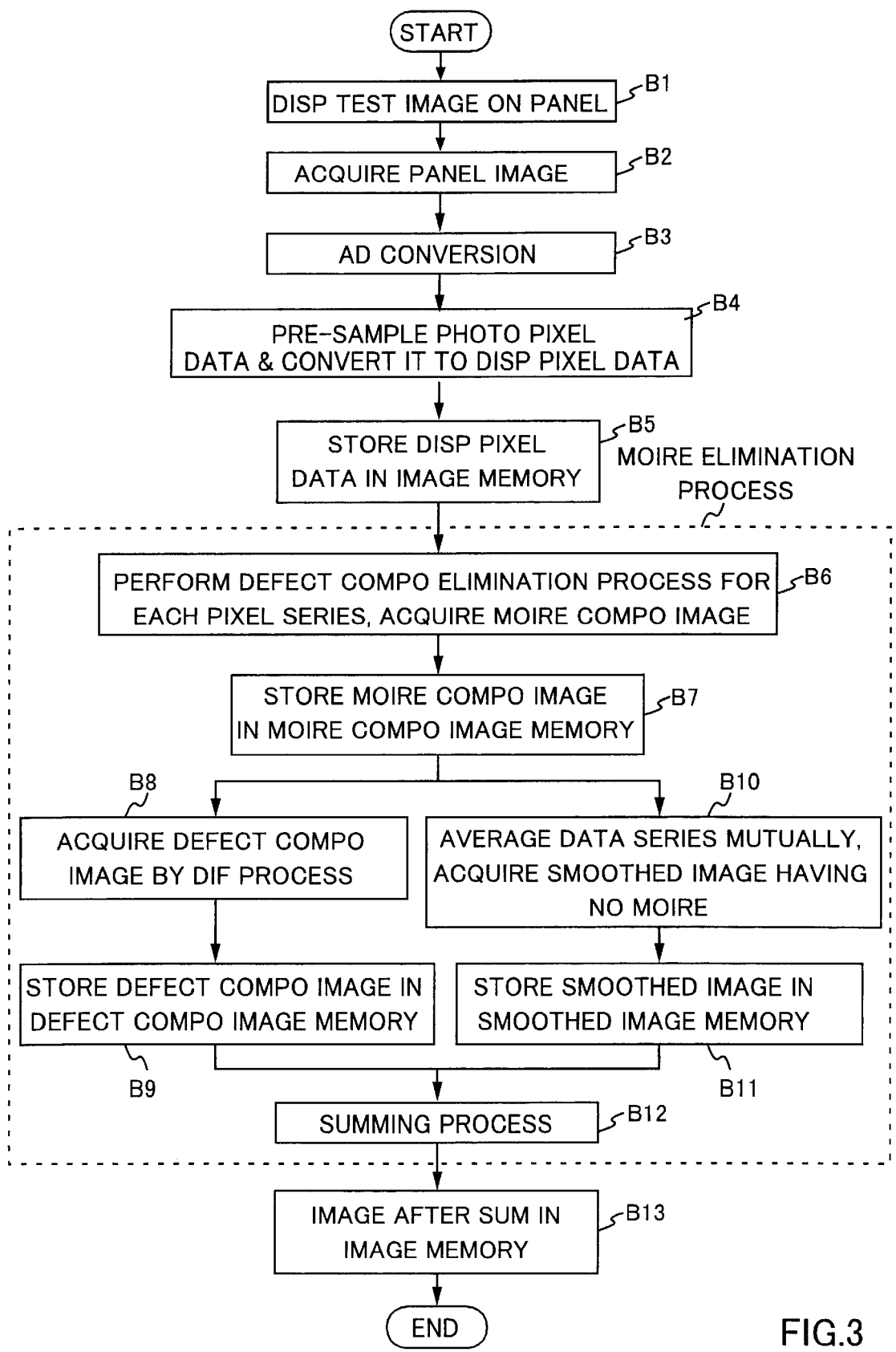
FIG. 3 is a flow-chart for explaining processing steps of a first embodiment of the image acquisition method for inspection of a flat panel display according to the present invention.

FIG. 3 is a flow-chart showing an example of the processing steps of the first embodiment of the image acquisition method. First in step B1, a predetermined driving signal is supplied from the panel driver part 2 to the flat panel display (LCD) 8 to display thereon a properly defined test image. In step B2, the test image (image of light and darkness) displayed on the panel of the flat panel display 8 is picked up by a camera part 3 with a built-in solid state image pickup element (solid state camera). The output signal (image signal of light and darkness) from the camera part 3 is supplied, in step B3, to the AD converter 4 to convert the output signal into a digital image signal of light and darkness, i.e., pickup pixel data. In next step B4, the pickup pixel data obtained in the previous step B3 is pre-sampled to convert the pickup pixel data into display pixel data each pixel of which has the same size as the display pixel size (the pixel size of LCD). This display pixel data is stored in the image memory 7 in next step B5.

Next, in step B6, the display pixel data stored in the image memory 7 is read out therefrom, and the median processing is applied to the read out display pixel data at intervals of m pixels i.e., at the moiré period for each pixel series in the longitudinal direction (Y-axis direction) or in the lateral direction (X-axis direction) to obtain the moiré component image data f(n) from which the defect component has been eliminated. This moiré component image data f(n) is stored, in step B7, in the moiré component image memory M2.

In next step B8, the moiré component image data f(n) stored in the moiré component image memory M2 is read out therefrom, and the display pixel data stored in the image memory 7 is read out therefrom. A difference between the display pixel data and the moiré component image data f(n) is taken to obtain the defect component image data J(n). This defect component image data J(n) is stored, in next step B9, in the defect component image memory M4.

On the other hand, also in step B10, the moiré component image data f(n) is read out from the moiré component image memory M2, and for example, a weighted averaging process is applied to the moiré, component image data f(n) for each pixel series in the same direction as that in the median process in the previous step B6 to obtain the smoothed image data F(n) from which the moiré has been eliminated. This smoothed image data F(n) from which the moiré has been eliminated is stored, in next step B11, in the smoothed image memory M6.

In next step B12, the stored defect component image data J(n) and the smoothed image data F(n) from which the moiré has been eliminated are read out from the defect component image memory M4 and the smoothed image memory, respectively, to add both the image data. The image data H(n) obtained in this adding process is stored, in next step B13, in the image memory 7. This image data H(n) can be used as image data for inspection used by an image quality inspection apparatus in case of inspecting whether any pixel defect (loss), an uneven display, or the like in a flat panel display exists or not.

Figure 4:
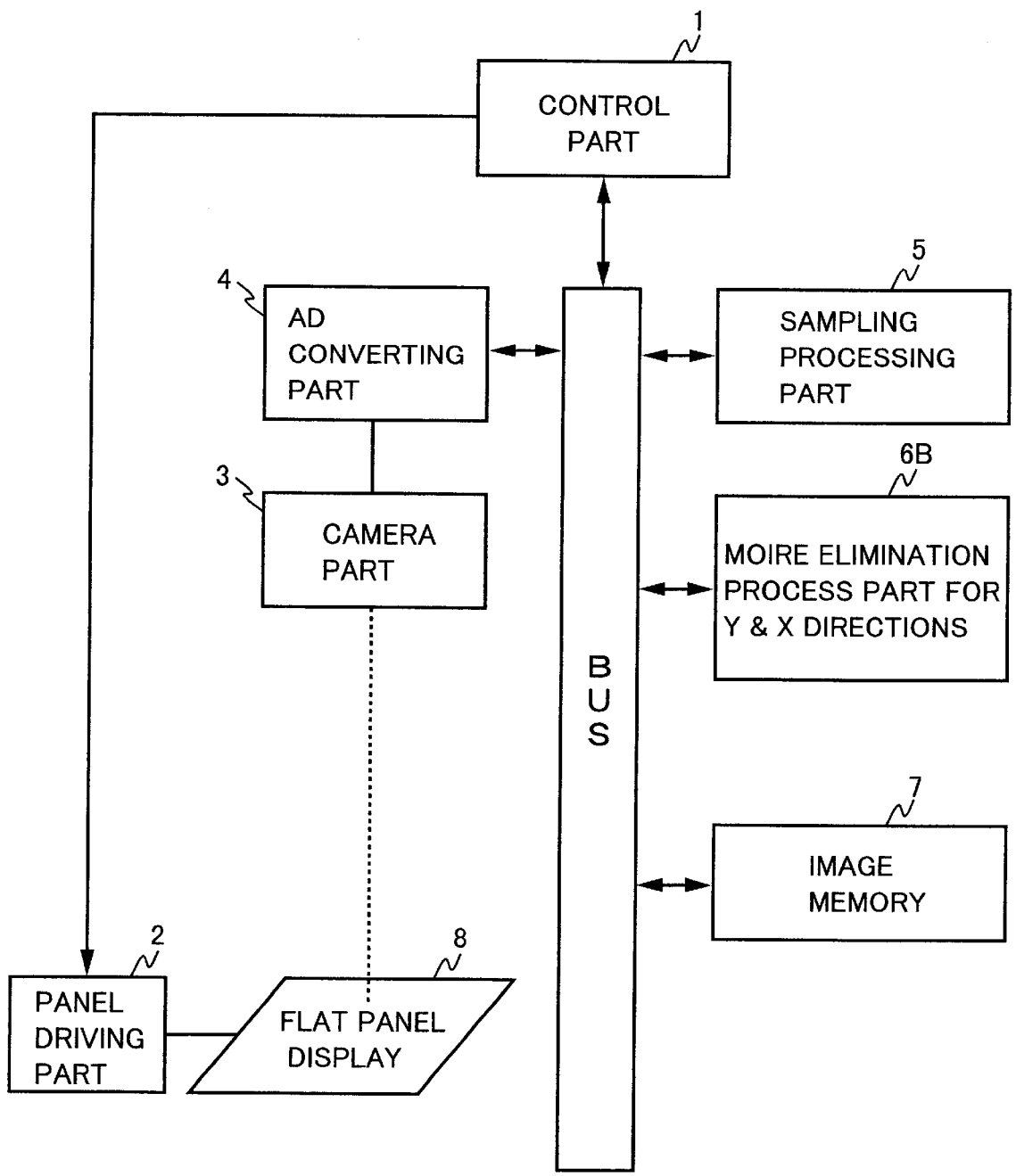
FIG. 4 is a block diagram showing a second embodiment of the image acquisition apparatus for inspection of a flat panel display according to the present invention.
Figure 5:
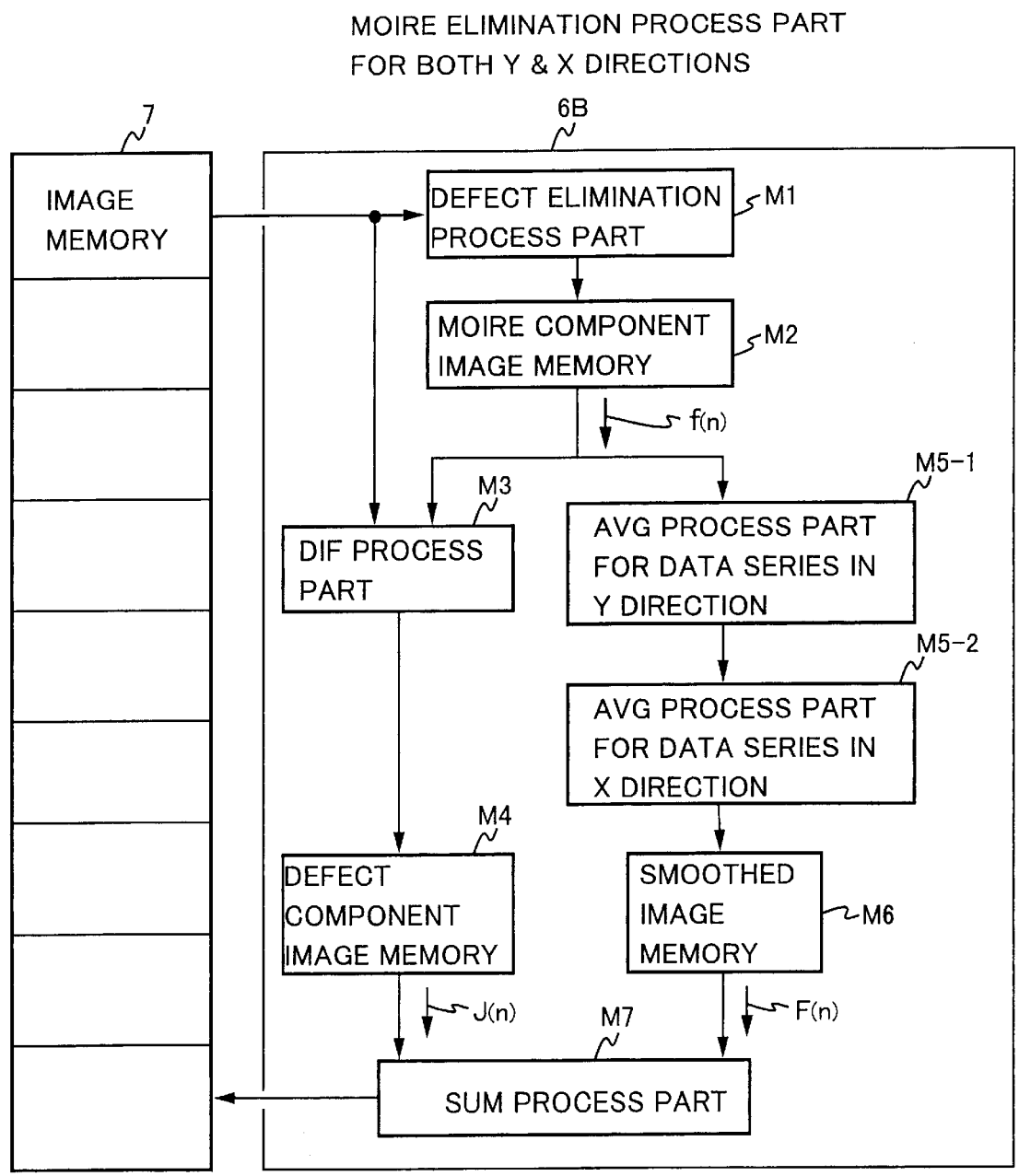
FIG. 5 is a block diagram showing an example of the internal construction of a moiré elimination processing part used in the image acquisition apparatus shown in FIG. 4.

FIG. 4 is a block diagram showing a second embodiment of the image acquisition apparatus for inspection of a flat panel display according to the present invention. FIG. 5 is a block diagram showing an example of the internal construction of the moiré elimination processing part used in the image acquisition apparatus shown in FIG. 4. This second embodiment is characterized in that the moiré elimination processing part 6B performs the moiré eliminating process in both of the X-axis direction and the Y-axis direction. Therefore, this moiré elimination processing part 6B has, as shown in FIG. 5, two stages of averaging process parts, namely, an averaging process part M5-1 for the Y-axis direction and an averaging process part M5-2 for the X-axis direction. The averaging process part M5-1 for the Y-axis direction performs the averaging process for each data series in the Y-axis direction, and the averaging process part M5-2 for the X-axis direction performs the averaging process in the X-axis direction.

Further, except for the process that the two stages of the average processing parts M5-1 and M5-2 of the moiré elimination processing part 6B perform the moiré eliminating processes in both of the Y-axis direction and the X-axis direction, the operation of the image acquisition apparatus of the second embodiment is the same as that of the aforementioned image acquisition apparatus of the first embodiment. Therefore, the explanation of the operation will be omitted. In addition, in FIG. 5, the averaging process in the Y-axis direction is performed first, and thereafter the averaging process in the X-axis direction is performed. However, the same result can be obtained regardless of the process sequence of the averaging process in the Y-axis direction and the averaging process in the X-axis direction. That is, the averaging process in the X-axis direction may be performed first, and thereafter the averaging process in the Y-axis direction is performed. Moreover, the moiré eliminating process by the two stages of the averaging process parts M5-1 and M5-2 is used in the second embodiment of the image acquisition method for inspection of a flat panel display according to the present invention.

Figure 6:
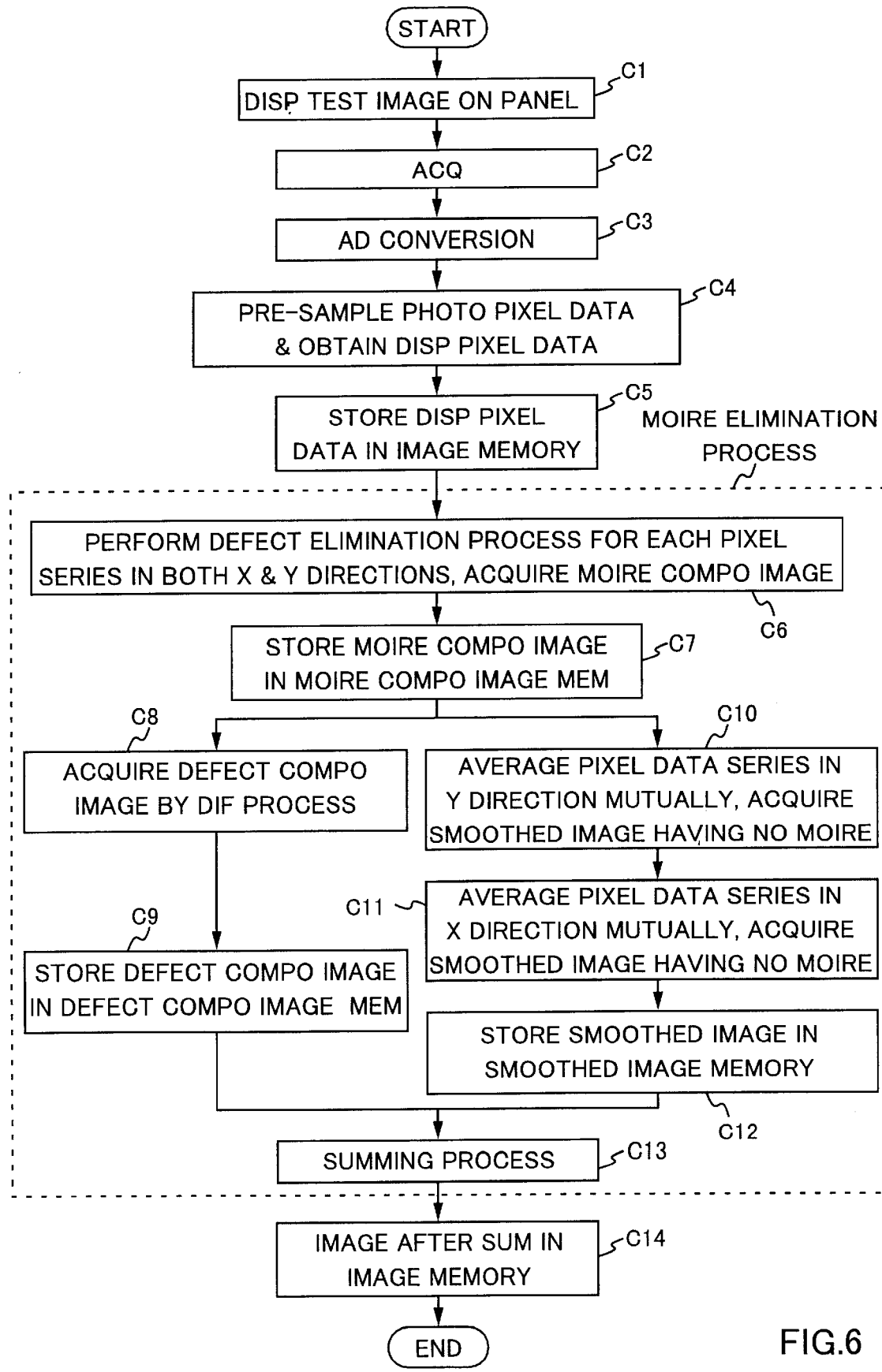
FIG. 6 is a flow-chart for explaining processing steps of a second embodiment of the image acquisition method for inspection of a flat panel display according to the present invention.

FIG. 6 is a flow-chart for explaining an example of the processing steps of the second embodiment of the method for acquiring an image for inspection of a flat panel display according to the present invention. This method for acquiring an image of the second embodiment is different from the method for acquiring an image of the first embodiment shown in FIG. 3 only in the point that after the averaging process of the pixel data series in Y-axis direction is performed in step C10, then the averaging process of the pixel data series in X-axis direction is further performed in step C11. Therefore, the explanation of the process steps of the second embodiment will be omitted.

Further, in the flow-chart shown in FIG. 6, the averaging process in Y-axis direction is performed first, and the averaging process in X-axis direction is performed next. However, the same result can be obtained regardless of the process sequence of the averaging process in Y-axis direction and the averaging process in X-axis direction. That is, the averaging process in X-axis direction may be performed first and the averaging process in Y-axis direction next.

Figure 7:
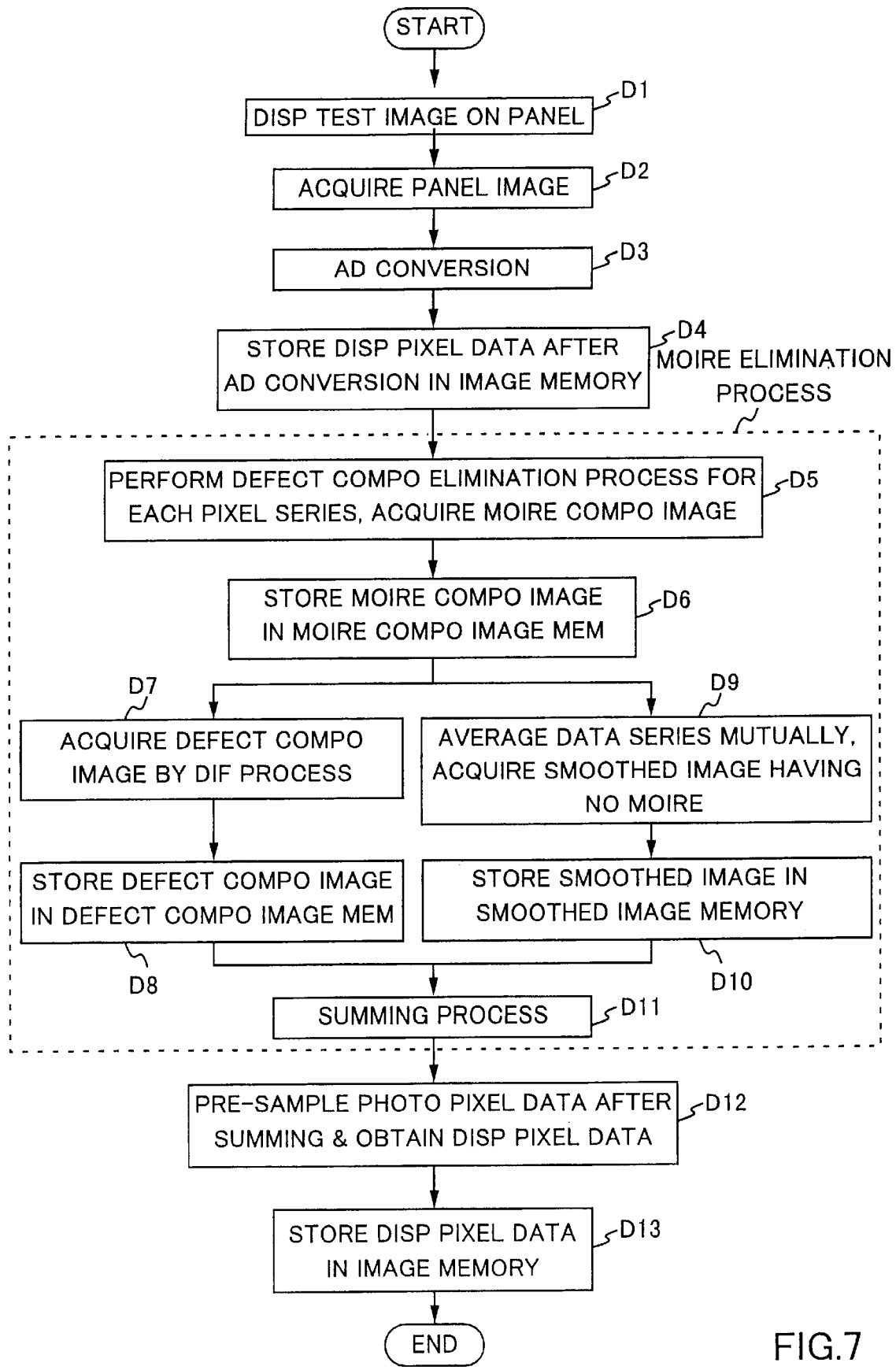
FIG. 7 is a flow-chart for explaining processing steps of a third embodiment of the image acquisition method for inspection of a flat panel display according to the present invention.

FIG. 7 is a flow-chart for explaining an example of the processing steps of the third embodiment of the method for acquiring an image for inspection of a flat panel display according to the present invention. The third embodiment of the method for acquiring an image is same as the method for acquiring an image of the first embodiment shown in FIG. 3 except the point that "the process for pre-sampling the pickup pixel data to convert the pickup pixel data into a display pixel data having a display pixel size (pixel size of LCD)" which is performed in the step B4 of the first embodiment shown in FIG. 3 is performed in step D12 which is the next step of the addition processing step D11. Therefore, the explanation of the processing steps of the third embodiment will be omitted. However, since the pre-sampling process performed in step D12 is performed after the moiré eliminating process, the moiré eliminating process is applied to the pickup pixel data converted into the digital photographed signal by the AD converter 4. The method of this moiré eliminating process is applied in either of Y-axis direction or X-axis direction as the object from which the moiré is to be eliminated, and hence this point is quite same as the case of the first embodiment.

Figure 8:
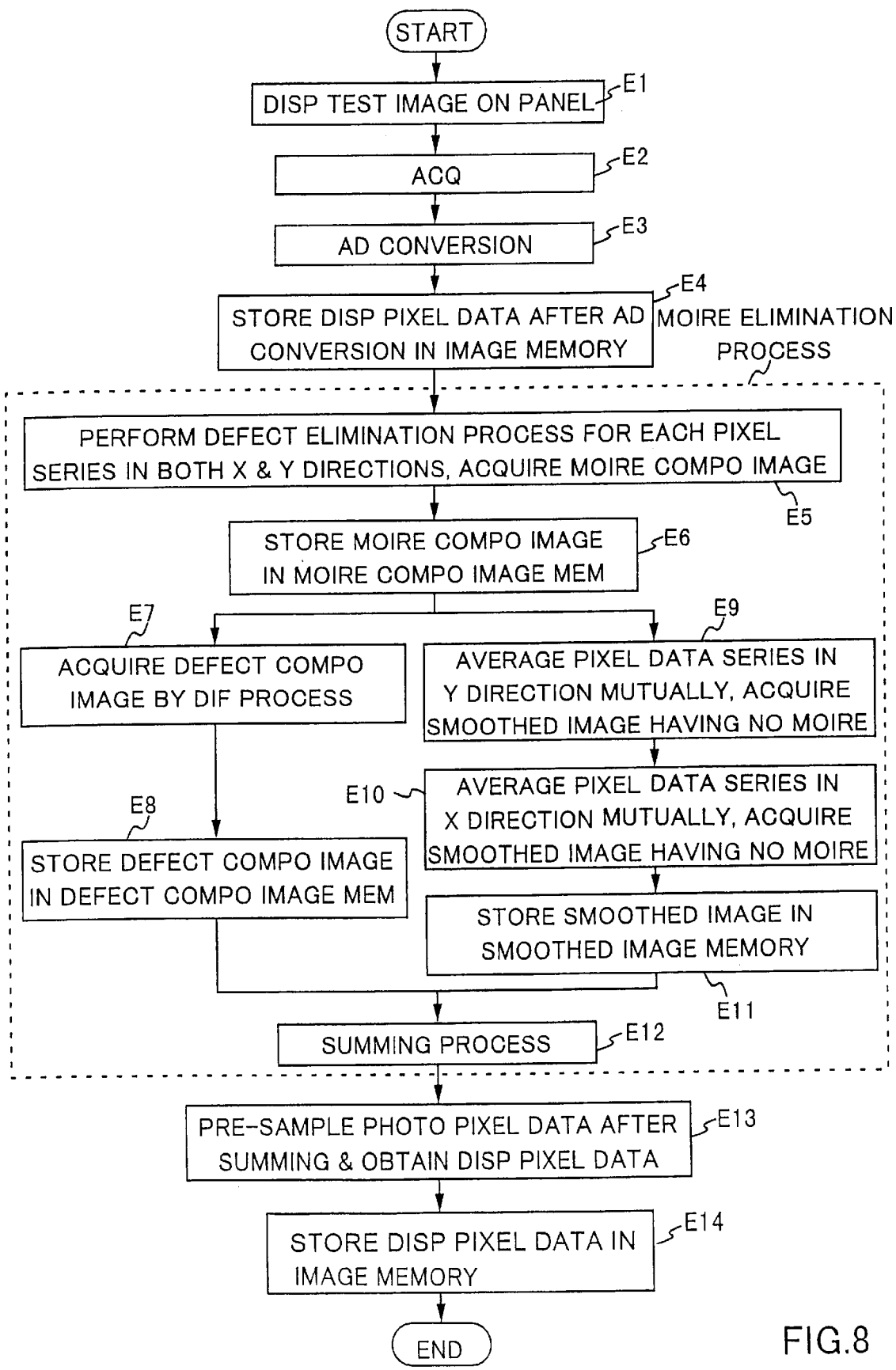
FIG. 8 is a flow-chart for explaining processing steps of a fourth embodiment of the image acquisition method for inspection of a flat panel display according to the present invention.

FIG. 8 is a flow-chart for explaining an example of the processing steps of the fourth embodiment of the method for acquiring an image for inspection of a flat panel display according to the present invention. The fourth embodiment of the method for acquiring an image is same as the method for acquiring an image of the first embodiment shown in FIG. 3 except the points that "the process for pre-sampling the pickup pixel data to convert the pickup pixel data into a display pixel data having a display pixel size (pixel size of LCD)" which is performed in the step B4 of the first embodiment shown in FIG. 3 is performed in step E13 which is the next step of the addition processing step E12 and that the object from which the moiré is to be eliminated is set to both of Y-axis direction and X-axis direction. Therefore, the explanation of the processing steps of the fourth embodiment will be omitted.

Since the pre-sampling process performed in step E13 is also performed in this fourth embodiment after the moiré eliminating process, the moiré eliminating process is applied to the pickup pixel data converted into the digital photographed signal by the AD converter 4. The method of this moiré eliminating process is applied, as mentioned above, in both Y-axis direction and X-axis direction as the object from which the moiré is to be eliminated, and hence this point is different from the case of the first embodiment.

As is apparent from the above description, there is a case that the intensity of moiré (magnitude of the amplitude) is different between X-axis direction and Y-axis direction. When the moiré in one direction is small and negligible, it is sufficient to perform the moiré eliminating process in only the direction in which the intensity of moiré is more intensive than the other. On the other hand, when the moiré is intensive in both directions of X-axis direction and Y-axis direction, it is necessary to perform the moiré eliminating process in both directions. Moreover, the moiré has already been produced on the digital photographed image (CCD image) acquired by photographing the image of light and darkness of the flat panel display and by converting this photographed signal into a digital signal, and in addition, the moiré is also produced on the pre-sampled image (LCD image) acquired by pre-sampling the CCD image. This is because, as already described, the moiré in the CCD image is reflected in the LCD image. Therefore, there are two cases for eliminating the moiré, i.e., a case that the moiré eliminating process is performed in the stage of CCD image and the other case that the moiré eliminating process is performed after the LCD image is acquired.

Therefore, the aforementioned embodiments of the method for acquiring an image for inspection of a flat panel display according to the present invention correspond to a difference between a case that the direction of the moiré eliminating process is either of Y-axis direction or X-axis direction and a case that the direction of the moiré eliminating process is both of Y-axis direction and X-axis direction, and to a difference between a case that the moiré eliminating process is performed before the pre-sampling process and a case that the moiré eliminating process is performed after the pre-sampling process, respectively.

In addition, regarding the configuration of the apparatus for acquiring an image for realizing the method for acquiring an image for inspection of a flat panel display according to the present invention, it is sufficient if there are provided a configuration of the first embodiment shown in FIG. 1 with the moiré elimination processing part 6A shown in FIG. 2 added thereto and a configuration of the second embodiment shown in FIG. 4 with the moiré elimination processing part 6B shown in FIG. 5 added thereto. Those configurations can cope with all the methods for acquiring an image.

As mentioned above, according to the present invention, even if the number of pixels of a flat panel display and the number of pixels of a image pickup element are in the relationship of non-integer multiple, a smoothed image data from which the moiré is eliminated can be obtained. Therefore, there can be obtained a remarkable effect that a flat panel display can accurately be inspected without providing a image pickup element having the pixels the number of which is beyond the limitation, even if the flat panel display becomes highly precise.

While the present invention has been described with regard to the preferred embodiments shown by way of example, it will be apparent to those skilled in the art that various modifications, alterations, changes, and/or minor improvements of the embodiments can be made without departing from the spirit and the scope of the present invention. Accordingly, it should be understood that the present invention is not limited to the embodiments shown and described above, and is intended to include such various modifications, alterations, changes, and/or minor improvements falling within the invention defined by the appended claims.

What is claimed is:

1. A method for acquiring an image for inspection of a flat panel display including the steps of:

displaying an image for inspection on a flat panel display to be inspected, and picking up the inspection image by a solid state image pickup element to convert the pickup image signal to a digital signal, thereby to obtain pickup pixel data each pixel of which has a pixel value corresponding to the pixel size of said solid state image pickup element; and applying a pre-sampling processing to the pickup pixel data, thereby to obtain display pixel data each pixel of which has a pixel value corresponding to the pixel size of said flat panel display, said method further including the steps of:

storing the display pixel data in an image memory;

obtaining a plurality of moiré component image data which comprises the steps of: detecting any moiré in respect to either direction of X-axis direction or Y-axis direction occurring in the display pixel data stored in said image memory; forming a plurality of data series, each data series being collected from the display pixel data at intervals of the number of pixels of the display pixel data corresponding to the occurrence period of the moiré, the number of said plurality of data series depending upon the number of pixels included within the occurring period of the moiré; and smoothing pixel values of each of the plurality of data series, thereby to obtain a plurality of moiré component image data from which defect components have been eliminated;

taking a difference between the moiré component image data and the display pixel data to find defect component image data;

storing the defect component image data in a defect component image memory;

giving a pixel value to a pixel having no pixel value in each moiré component image data by an interpolation operation, and finding a mutual average value of the plurality of the moiré component image data to obtain smoothed image data from which the moiré has been eliminated; and storing the smoothed image data in a smoothed image memory, and wherein the defect component image data stored in said defect component image memory and the smoothed image data stored in said smoothed image memory are maintained as image data for inspection of the flat panel display.

2. The method according to claim 1, wherein said step of obtaining a plurality of moiré component image data is a step of sequentially detecting any moiré in respect to both the X-axis and the Y-axis directions, and obtaining a plurality of moiré component image data from which defect components have been eliminated in respect to both the X-axis and the Y-axis directions.

3. The method according to claim 1, further including a step of adding the defect component image data and the smoothed image data, and storing the addition result in said image memory as image data for inspection of the flat panel display.

4. The method according to claim 2, further including a step of adding the defect component image data and the smoothed image data, and storing the addition result in said image memory as image data for inspection of the flat panel display.

5. A method for acquiring an image for inspection of a flat panel display including the steps of:

displaying an image for inspection on a flat panel display to be inspected, and picking up the inspection image by a solid state image pickup element to convert the pickup image signal to a digital signal, thereby to obtain pickup pixel data each pixel of which has a pixel value corresponding to the pixel size of said solid state image pickup element; and applying a pre-sampling processing to the pickup pixel data, thereby to obtain display pixel data each pixel of which has a pixel value corresponding to the pixel size of said flat panel display, said method further including the steps of:

storing the pickup pixel data in an image memory;

obtaining a plurality of moiré component image data which comprises the steps of: detecting any moiré in respect to either direction of X-axis direction or Y-axis direction occurring in the pickup pixel data stored in said image memory; forming a plurality of data series, each data series being collected from the pickup pixel data at intervals of the number of pixels of the pickup pixel data corresponding to the occurrence period of the moiré, the number of said plurality of data series depending upon the number of pixels included within the occurring period of the moiré; and smoothing pixel values of each of the plurality of data series, thereby to obtain a plurality of moiré component image data from which defect components have been eliminated;

taking a difference between the moiré component image data and the pickup pixel data to find a defect component image data;

storing the defect component image data in a defect component image memory;

giving a pixel value to a pixel having no pixel value in each moiré component image data by an interpolation operation, and finding a mutual average value of the plurality of the moiré component image data to obtain smoothed image data from which the moiré has been eliminated;

storing the smoothed image data in a smoothed image memory;

adding the defect component image data stored in said defect component image memory and the smoothed image data stored in said smoothed image memory; and applying a pre-sampling processing to the image data obtained in said adding step to obtain display pixel data each pixel of which has a pixel value corresponding to a pixel size of the flat panel display, and wherein the display pixel data obtained in said step of applying a pre-sampling processing is maintained as image data for inspection of the flat panel display.

6. The method according to claim 5, wherein said step of obtaining a plurality of moiré component image data is a step of sequentially detecting any moiré in respect to both the X-axis and the Y-axis directions, and obtaining a plurality of moiré component image data from which defect components have been eliminated in respect to both the X-axis and the Y-axis directions.

7. The method according to claim 6, further including the step of storing the display pixel data obtained in the step of applying a pre-sampling process in said image memory as image data for inspection of the flat panel display.

8. The method according to claim 5, further including the step of storing the display pixel data obtained in the step of applying a pre-sampling process in said image memory as image data for inspection of the flat panel display.

\* \* \* \* \*